United States Patent
Toyooka

(10) Patent No.: US 9,769,439 B2
(45) Date of Patent: Sep. 19, 2017

(54) PROJECTOR AND METHOD FOR CONTROLLING THE SAME THE SAME THAT ADJUST LIGHT SOURCE OUTPUT BASED ON A CORRECTED DETECTED LIGHT BRIGHTNESS

(71) Applicant: SEIKO EPSON CORPORATION, Tokyo (JP)

(72) Inventor: Takashi Toyooka, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 145 days.

(21) Appl. No.: 14/106,266

(22) Filed: Dec. 13, 2013

(65) Prior Publication Data

US 2014/0192331 A1  Jul. 10, 2014

(30) Foreign Application Priority Data

Jan. 4, 2013 (JP) .................................. 2013-000064
Oct. 3, 2013 (JP) .................................. 2013-208551

(51) Int. Cl.
| | |
|---|---|
| *H04N 9/31* | (2006.01) |
| *G03B 21/00* | (2006.01) |
| *G03B 21/20* | (2006.01) |
| *G03B 33/12* | (2006.01) |

(52) U.S. Cl.
CPC ......... *H04N 9/3155* (2013.01); *G03B 21/006* (2013.01); *G03B 21/2033* (2013.01); *G03B 21/2053* (2013.01); *G03B 21/2073* (2013.01); *G03B 33/12* (2013.01); *H04N 9/3194* (2013.01)

(58) Field of Classification Search
CPC .. H04N 9/3155; H04N 9/3161; H04N 9/3164; H04N 9/3144; H04N 9/3191; H04N 9/3194; G03B 21/2053
See application file for complete search history.

(56) References Cited

U.S. PATENT DOCUMENTS

| | | | | |
|---|---|---|---|---|
| 7,303,318 | B2* | 12/2007 | Wang ................... | G09G 3/3406 353/57 |
| 8,165,179 | B2* | 4/2012 | Brown ................ | H01S 5/06835 372/29.011 |
| 8,235,534 | B2* | 8/2012 | Nakayama ............. | G03B 21/00 250/363.07 |
| 8,249,120 | B2* | 8/2012 | Brown ................ | H01S 5/06835 372/29.015 |
| 8,665,920 | B2* | 3/2014 | Huang ................. | H04N 9/3129 372/38.01 |
| 8,794,765 | B2* | 8/2014 | Shibasaki ............ | H04N 9/3111 353/30 |

(Continued)

FOREIGN PATENT DOCUMENTS

| | | |
|---|---|---|
| JP | 2005-208231 A | 8/2005 |
| JP | 2008-034190 A | 2/2008 |

(Continued)

*Primary Examiner* — Bao-Luan Le
(74) *Attorney, Agent, or Firm* — Oliff PLC

(57) ABSTRACT

A projector includes a light detector that detects light brightness information on the brightness of light emitted from a light source and an adjuster that corrects the light brightness information detected with the light detector and adjusts the output from the light source based on the corrected light brightness information.

14 Claims, 18 Drawing Sheets

(56) References Cited

U.S. PATENT DOCUMENTS

| | | | | |
|---|---|---|---|---|
| 2006/0192727 A1* | 8/2006 | Wang | .................... | G09G 3/3406 |
| | | | | 345/30 |
| 2006/0215124 A1* | 9/2006 | Seo | ........................ | G03B 21/16 |
| | | | | 353/52 |
| 2010/0156863 A1* | 6/2010 | Brown | .................. | H04N 9/3194 |
| | | | | 345/207 |
| 2010/0201894 A1* | 8/2010 | Nakayama | ............. | G03B 21/00 |
| | | | | 348/745 |
| 2011/0181791 A1* | 7/2011 | Huang | ................. | H04N 9/3158 |
| | | | | 348/744 |
| 2012/0050691 A1 | 3/2012 | Tsuda et al. | | |
| 2012/0092624 A1 | 4/2012 | Oiwa et al. | | |
| 2012/0176549 A1* | 7/2012 | Brown | ................. | H04N 9/3194 |
| | | | | 348/725 |
| 2012/0249976 A1* | 10/2012 | Shibasaki | ............ | H04N 9/3111 |
| | | | | 353/52 |
| 2012/0327379 A1* | 12/2012 | Enomoto | ............... | G03B 21/16 |
| | | | | 353/52 |
| 2013/0016305 A1* | 1/2013 | Kaneda | ................... | F21V 13/00 |
| | | | | 349/61 |
| 2013/0120714 A1 | 5/2013 | Nishioka et al. | | |
| 2014/0049757 A1* | 2/2014 | Naitou | ............... | G03B 21/2053 |
| | | | | 353/86 |

FOREIGN PATENT DOCUMENTS

| | | |
|---|---|---|
| JP | 2011-165607 A | 8/2011 |
| JP | 2012-027267 A | 2/2012 |
| JP | A-2012-047951 | 3/2012 |
| JP | 2012-088451 A | 5/2012 |
| JP | 2013-080149 A | 5/2013 |

* cited by examiner

PROJECTOR AND METHOD FOR CONTROLLING THE SAME THE SAME THAT ADJUST LIGHT SOURCE OUTPUT BASED ON A CORRECTED DETECTED LIGHT BRIGHTNESS

PROJECTOR AND METHOD FOR CONTROLLING THE SAME

The entire disclosure of Japanese Patent Application Nos. 2013-000064, filed Jan. 4, 2013 and 2013-208551, filed Oct. 3, 2013 are expressly incorporated by reference herein.

BACKGROUND

1. Technical Field

The present invention relates to a projector and a method for controlling the same.

2. Related Art

A projector includes a light source, a light modulator, and a projection lens, and the light modulator modulates light emitted from the light source and the projection lens projects the modulated light on a screen. An image is thus displayed on the screen. A projector of related art uses a halogen lamp, a metal halide lamp, or a high-pressure mercury lamp as the light source; in recent years, a projector including a laser diode, a light emitting diode, or any other solid-state light source has been developed.

JP-A-2012-47951 discloses a projector including a solid-state light source that emits excitation light, a fluorophore that converts the excitation light into fluorescence, a light modulator that modulates the light from the fluorophore, and a projection system that projects the light modulated by the light modulator on a screen. JP-A-2012-47951 further discloses that the projector may include an optical sensor that detects at least one of the excitation light through the fluorophore and the converted fluorescence from the fluorophore. JP-A-2012-47951 further discloses that the projector may include a controller that controls at least one of the solid-state light source and the light modulator in accordance with a detection result from the optical sensor.

Deterioration of the light source undesirably causes a discrepancy between the brightness of an image displayed by the projector and desired brightness.

SUMMARY

An advantage of some aspects of the invention is to provide a projector that can display an image having brightness close to desired brightness and a method for controlling the projector.

(1) One aspect of the invention relates to a projector including a light detector that detects light brightness information on brightness of light emitted from a light source and an adjuster that corrects the light brightness information detected with the light detector and adjusts an output from the light source based on the corrected light brightness information. In the thus configured projector, since the adjuster corrects the light brightness information detected with the light detector and refers to the corrected light brightness information to adjust the output from the light source, the brightness of a displayed image can be close to desired brightness.

(2) One aspect of the invention relates to the projector described above, wherein the projector further includes a temperature detector that detects temperature information representing temperature, and the adjuster corrects the light brightness information detected with the light detector based on the temperature information detected with the temperature detector and adjusts the output from the light source based on the corrected light brightness information. The thus configured projector, which corrects the light brightness information based on the temperature information, can improve precision in the adjustment of the output from the light source, whereby the brightness of a displayed image can be close to desired brightness.

(3) One aspect of the invention relates to the projector described above, wherein the light source includes a first light source and a second light source; the light detector includes a first light detector corresponding to the first light source and a second light detector corresponding to the second light source; the temperature detector includes a first temperature detector corresponding to the first light source and a second temperature detector corresponding to the second light source; and the adjuster corrects first light brightness information detected with the first light detector based on first temperature information detected with the first temperature detector, corrects second light brightness information detected with the second light detector based on second temperature information detected with the second temperature detector, and adjusts one or both of an output from the first light source and an output from the second light source based on the corrected first light brightness information and the corrected second light brightness information. The thus configured projector, which corrects the light brightness information associated with the first and second light sources based on the temperature information associated therewith, can improve precision in the adjustment of the output from each of the light sources, whereby the brightness of a displayed image can be close to desired brightness.

(4) One aspect of the invention relates to the projector described above, wherein the projector further includes a first light modulation device corresponding to the first light source and a second light modulation device corresponding to the second light source, the first light detector detects first light brightness information on brightness of light between the first light source and the first light modulation device; the second light detector detects second light brightness information on brightness of light between the second light source and the second light modulation device; the first temperature detector includes a first light source peripheral temperature detector that detects first light source peripheral temperature information representing temperature at a periphery of the first light source and a first light modulation device peripheral temperature detector that detects first light modulation device peripheral temperature information representing temperature at a periphery of the first light modulation device; and the second temperature detector includes a second light source peripheral temperature detector that detects second light source peripheral temperature information representing temperature at a periphery of the second light source and a second light modulation device peripheral temperature detector that detects second light modulation device peripheral temperature information representing temperature at a periphery of the second light modulation device. The thus configured projector, which corrects the light brightness information associated with the first and second light sources based on the light source peripheral temperature information and the light modulation device peripheral temperature information associated therewith, can improve precision in the adjustment of the output from each of the light sources, whereby the brightness of a displayed image can be close to desired brightness.

(5) One aspect of the invention relates to the projector described above, wherein the first light source is a Y light source; the second light source is a B light source; and the first light detector and the first light modulation device peripheral temperature detector are provided in correspondence with one or both of R and G. The thus configured projector, which corrects the light brightness information associated with the first light source (Y light source) and the second light source (B light source) based on the light source peripheral temperature information and the light modulation device peripheral temperature information associated therewith, can improve precision in the adjustment of the output from each of the light sources, whereby the brightness of a displayed image can be close to desired brightness.

(6) One aspect of the invention relates to the projector described above, wherein the adjuster estimates light state information representing the state of the light emitted from the light source and adjusts the output from the light source based on the estimated light state information. The thus configured projector, even when the characteristics of the light emitted from the light source change due to deterioration of the light source, adjusts the output from the light source based on the light state information, whereby the brightness of a displayed image can be close to desired brightness.

(7) One aspect of the invention relates to the projector described above, wherein the adjuster refers to the light brightness information detected with the light detector to estimate the light state information. The thus configured projector can refer to the light luminance information to estimate the light state information, correct the light brightness information detected with the light detector based on the estimated light state information, and refer to the corrected light brightness information to adjust the output from the light source.

(8) One aspect of the invention relates to the projector described above, wherein the adjuster refers to the light brightness information detected with the light detector to estimate a change in the wavelength of the light and adjusts the output from the light source based on the estimated change in the wavelength of the light. The thus configured projector adjusts a shift of the output from the light source due to a change in the wavelength of the light, whereby the brightness of a displayed image can be close to desired brightness.

(9) One aspect of the invention relates to the projector described above, wherein the adjuster refers to the light brightness information detected with the light detector to estimate a change in the state of polarization of the light and adjusts the output from the light source based on the estimated change in the state of polarization of the light. The thus configured projector adjusts a shift of the output from the light source due to a change in the polarization of the light, whereby the brightness of a displayed image can be close to desired brightness.

(10) One aspect of the invention relates to the projector described above, wherein the light detector detects light brightness information on brightness of light different from light to be projected on a screen. The thus configured projector corrects the light brightness information on the brightness of light different from light to be projected on the screen based on the light state information and refers to the corrected light brightness information to adjust the output from the light source, whereby the brightness of a displayed image can be close to desired brightness.

(11) One aspect of the invention relates to the projector described above, wherein the projector further includes a polarization separation element that separates the light incident from the light source into differently polarized light fluxes, and the light detector receives the light fluxes separated by the polarization separation element and detects light brightness information on brightness of the light different from the light to be projected on the screen. The thus configured projector, in which the light detector detects light brightness information on polarized light that is not projected on the screen, can detect the light brightness information without lowering the amount of light to be projected on the screen.

(12) One aspect of the invention relates to the projector described above, wherein the projector further includes a temperature detector that detects temperature information representing temperature, and the adjuster refers to the temperature information detected with the temperature detector to estimate the light state information. The thus configured projector, which can refer to the temperature information to estimate the light state information, can correct an error in the light brightness information due to a shift in the wavelength of the light resulting from a change in temperature.

(13) One aspect of the invention relates to the projector described above, wherein the projector further includes a temperature detector that detects temperature information representing temperature and configured as follows: The adjuster refers to the light brightness information detected with the light detector and the temperature information detected with the temperature detector to estimate the light state information. The thus configured projector, which refers to both the light brightness information and the temperature information detected with the temperature detector to estimate the light state information, can improve accuracy of the light state information, whereby the brightness of a displayed image can be closer to desired brightness.

(14) One aspect of the invention relates to a method for controlling a projector, the method including the procedure of causing a light detector to detect light brightness information on brightness of light emitted from a light source and the procedure of causing an adjuster to correct the light brightness information detected with the light detector and adjust an output from the light source based on the corrected light brightness information. The thus controlled projector, which corrects the light brightness information, can improve precision in the adjustment of the output from the light source, whereby the brightness of a displayed image can be close to desired brightness.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Embodiments of the invention will be described below in detail with reference to the drawings. When a laser diode (hereinafter also referred to as LD) deteriorates, the wavelength of the light from the light source changes. Specifically, when an LD deteriorates and the amount of light incident on a fluorophore plate changes (the amount of light decreases, for example), the wavelength of the light outputted from the fluorophore plate changes. Now, the amount of light detected with an optical sensor before the LD deteriorates is used as a reference, and the proportion of the amount of light detected with the optical sensor after the LD deteriorates with respect to the reference is called the proportion of the sensor detected light amount (70%, for example). Further, the amount of light incident on a liquid crystal panel before the LD deteriorates is used as a reference, and the proportion of the amount of light incident on the liquid crystal panel after the LD deteriorates with respect to the reference is called the proportion of actual light amount (80%, for example). In this case, for example, when the proportion of the actual light amount is 80%, the proportion of the sensor detected light amount is 70% in some cases because the wavelength of the light from the light source shifts and the sensitivity of the optical sensor decreases accordingly. As described above, the spectral sensitivity of the optical sensor affects the proportion of the sensor detected light amount and the proportion of the actual light amount in such a way that they differ from each other.

The projector therefore cannot display an image of desired brightness. In contrast, a projector 50 in a first embodiment corrects the sensor detected light amount and refers to the corrected sensor detected light amount to adjust the output from the light source. The projector 50 can thus display an image having brightness close to desired brightness.

Figure 1:
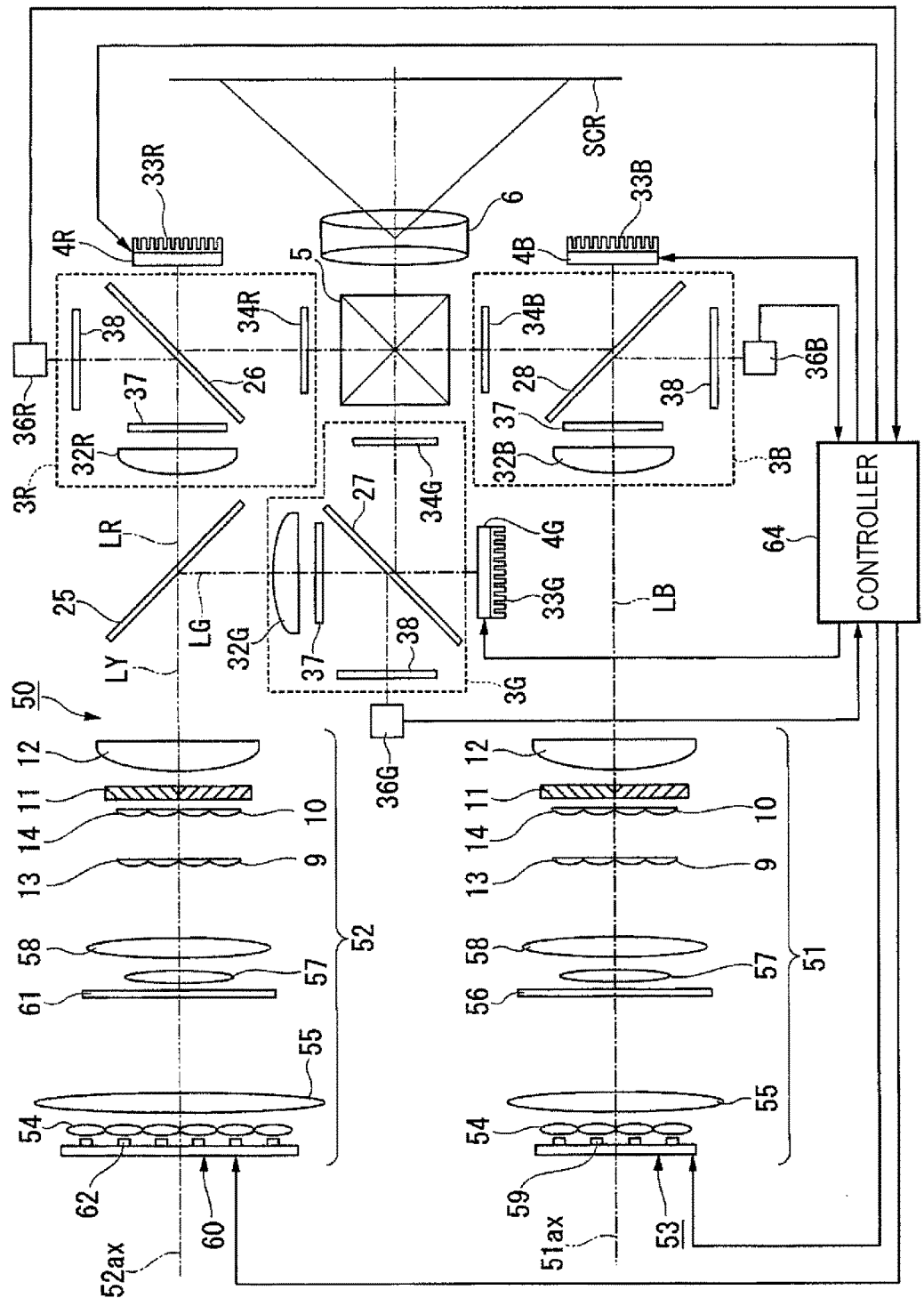
FIG. 1 is a schematic configuration diagram showing the configuration of a projector in a first embodiment.

FIG. 1 is a schematic block diagram showing the configuration of the projector 50 in the first embodiment. The projector 50 includes a blue light illuminator 51, a yellow light illuminator 52, a dichroic mirror 25, a light guide system 3R, a light guide system 3G, a light guide system 3B, a reflective liquid crystal panel (light modulator) 4R, a reflective liquid crystal panel (light modulator) 4G, a reflective liquid crystal panel (light modulator) 4B, a red light optical sensor 36R, a green light optical sensor 36O, a blue light optical sensor 36B, a cross dichroic prism 5, and a projection system 6, as shown in FIG. 1. The blue light illuminator 51 emits blue light LB formed primarily of P polarized light by way of example. The yellow light illuminator 52 emits yellow light LY formed primarily of P polarized light by way of example.

The dichroic mirror 25 is an optical element including a substrate on which a wavelength selective film that reflects a light flux of a predetermined wavelength range and transmits light fluxes of the other wavelength ranges is formed. In the present embodiment, the dichroic mirror 25 receives the yellow light LY outputted from the yellow light illuminator 52, transmits red light LR having a wavelength longer than a predetermined reference wavelength, and reflects green light LG having a wavelength shorter than or equal to the predetermined reference wavelength by way of example.

The light guide system 3R receives the red light LR having passed through the dichroic mirror 25 and guides S-polarized red light having been reflected off a polarizing beam splitter 26 to the red light optical sensor 36R. On the other hand, the light guide system 3R, which receives the red light LR having passed through the dichroic mirror 25, guides P-polarized red light having passed through the polarizing beam splitter 26 to the reflective liquid crystal panel 4R. Further, the light guide system 3R receives red light having been reflected off the reflective liquid crystal panel 4G and guides S-polarized red light having been reflected off the polarizing beam splitter 26 to the cross dichroic prism 5.

The light guide system 3G receives the green light LG having been reflected off the dichroic mirror 25 and guides S-polarized green light having been reflected off a polarizing beam splitter 27 to the green light optical sensor 36G. The light guide system 3G, which receives the green light LG having been reflected off the dichroic mirror 25, guides P-polarized green light having passed through the polarizing beam splitter 27 to the reflective liquid crystal panel 4G. Further, the light guide system 3G receives green light having been reflected off the reflective liquid crystal panel 4G and guides S-polarized green light having been reflected off the polarizing beam splitter 27 to the cross dichroic prism 5.

The light guide system 3B receives the blue light LB outputted from the blue light illuminator 51 and guides S-polarized blue light having been reflected off a polarizing beam splitter 28 to the blue light optical sensor 36B. The light guide system 3B, which receives the blue light LB outputted from the blue light illuminator 51, guides P-polarized blue light having passed through the polarizing beam splitter 28 to the reflective liquid crystal panel 4B. Further, the light guide system 3B receives blue light having been reflected off the reflective liquid crystal panel 4B and guides S-polarized blue light having been reflected off the polarizing beam splitter 28 to the cross dichroic prism 5.

The reflective liquid crystal panel 4R modulates the red light guided through the light guide system 3R in accordance with an image signal. Similarly, the reflective liquid crystal panel 4G modulates the green light guided through the light guide system 3G in accordance with an image signal. Similarly, the reflective liquid crystal panel 4B modulates the blue light guided through the light guide system 3B in accordance with an image signal.

The cross dichroic prism 5 combines the red light guided through the light guide system 3R, the green light guided through the light guide system 3G, and the blue light guided through the light guide system 3B with one another. The projection system 6 projects the combined light from the cross dichroic prism 5 on a screen SCR or any other projection surface.

The red light optical sensor 36R detects the brightness (light intensity by way of example in the present embodiment) of the S-polarized red light guided through the light guide system 3R. The red light optical sensor 36R outputs a red light intensity signal representing the light intensity of the detected red light to a controller 64. Similarly, the blue light optical sensor 36B detects the brightness (light intensity by way of example in the present embodiment) of the S-polarized blue light guided through the light guide system 3B. The blue light optical sensor 36B outputs a blue light intensity signal representing the light intensity of the detected blue light to the controller 64. Similarly, the green light optical sensor 36G detects the intensity of the S-polarized green light guided through the light guide system 3G. The green light optical sensor 36G outputs a green light intensity signal representing the intensity of the detected green light to the controller 64.

The blue light illuminator 51 includes a blue laser diode array 53, parallelizing lenses 54, a focusing lens 55, a diffuser plate 56, a pickup lens 57, a parallelizing lens 58, a first lens array 9, a second lens array 10, a polarization conversion element 11, and a superimposing lens 12.

The blue laser diode array 53 has, for example, 12 blue laser diodes 59 arranged in a 4×3 array. The parallelizing lenses 54, the number of which is the same as that of the blue laser diodes 59, are disposed in positions corresponding to the blue laser diodes 59. The first lens array 9 has a plurality of first lenslets 13 that divide an illumination light flux having exited out of the parallelizing lens 58 into a plurality of sub-light fluxes. The second lens array 10 has a plurality of second lenslets 14 corresponding to the plurality of first lenslets 13 in the first lens array 9. The polarization conversion element 11 converts the sub-light fluxes from the second lens array 10 into substantially one type of linearly polarized sub-light fluxes having an aligned polarization direction and outputs the resultant sub-light fluxes. The superimposing lens 12 superimposes the sub-light fluxes having exited out of the polarization conversion element 11 on an area to be illuminated.

The blue light LB emitted from each of the blue laser diodes 59 is parallelized by the corresponding parallelizing lens 54, then focused by the focusing lens 55, and incident on the diffuser plate 56, where the focused light forms a point light source. Blue diffused light from each of the point light sources in the diffuser plate 56 passes through the pickup lens 57, is parallelized by the parallelizing lens 58, and is then incident on the first lens array 9.

The first lens array 9 serves as a light flux dividing optical element that divides the parallelized light from the parallelizing lens 58 into a plurality of sub-light fluxes. The first lens array 9 has a configuration in which the plurality of first lenslets 13 are arranged in a matrix formed of multiple rows and columns in a plane perpendicular to an illumination optical axis 51ax. Although not described with reference to the figure, the outer shape of each of the first lenslets 13 is similar to the outer shape of an image formation area of the reflective liquid crystal panel 4B.

The second lens array 10 in conjunction with the superimposing lens 12 has a function of forming images of the first lenslets 13 in the first lens array 9 in the vicinity of the image formation area of the reflective liquid crystal panel 4B. The second lens array 10 has a configuration in which the plurality of second lenslets 14 are arranged in a matrix formed of multiple rows and columns in a plane perpendicular to the illumination optical axis 51ax, as the first lens array 9 does.

The polarization conversion element 11 converts the polarization directions of the divided sub-light fluxes from the first lens array 9 into an aligned polarization direction and outputs substantially one type of linearly polarized sub-light fluxes. The polarization conversion element 11 includes a polarization separation layer that receives the illumination light fluxes from the blue laser diodes 59, transmits one type of polarized light (P-polarized light, for example), and reflects the other type of polarized light (S-polarized light, for example) in a direction perpendicular to the illumination optical axis 51ax, a reflection layer that reflects the light having the other type of polarization component and having been reflected off the polarization separation layer in the direction parallel to the illumination optical axis 51ax, and a retardation plate that converts the light having the one type of polarization component and having passed through the polarization separation layer into light having the other type of polarization component. The light having passed through the polarization conversion element 11 is mostly but not entirely P-polarized light and therefore also contains S-polarized light.

The superimposing lens 12 is an optical element that collects the plurality of sub-light fluxes having passed through the first lens array 9, the second lens array 10, and the polarization conversion element 11 and superimposes the sub-light fluxes on one another in the vicinity of the image formation area of the reflective liquid crystal panel 4B. The superimposing lens 12 is so disposed that the optical axis of the superimposing lens 12 substantially coincides with the illumination optical axis 51ax of the blue light illuminator 51. The superimposing lens 12 may be a compound lens that is a combination of a plurality of lenses.

The yellow light illuminator 52 includes an excitation laser diode array 60, parallelizing lenses 54, a focusing lens 55, a fluorophore substrate 61, a pickup lens 57, a parallelizing lens 58, a first lens array 9, a second lens array 10, a polarization conversion element 11, and a superimposing lens 12. The excitation laser diode array 60 has, for example, 30 excitation laser diodes 62 arranged in a 6×5 array. Each of the excitation laser diodes 62 emits ultraviolet or blue light as excitation light that excites a fluorophore. The parallelizing lenses 54 are so provided that they correspond to the excitation laser diodes 62. The fluorophore substrate 61 includes a substrate on which a fluorophore layer is formed, and the fluorophore layer emits yellow light when excited with the excitation light, such as ultraviolet light or blue light.

The excitation light emitted from each of the excitation laser diodes 62 is parallelized by the corresponding parallelizing lens 54, focused by the focusing lens 55, and incident on the fluorophore substrate 61, where the focused light forms a point light source. Yellow light LY emitted from each of the point light sources in the fluorophore substrate 61 passes through the pickup lens 57, is parallelized by the parallelizing lens 58, and is then incident on the first lens array 9.

The first lens array 9, the second lens array 10, the polarization conversion element 11, and the superimposing lens 12 in the yellow light illuminator 52 are configured in the same manner as the first lens array 9, the second lens array 10, the polarization conversion element 11, and the superimposing lens 12 in the blue light illuminator 51, and no description of the components described above in the yellow light illuminator 52 will therefore be made. The yellow light illuminator 52, however, differs from the blue light illuminator 51 in that it has an illumination optical axis 52ax instead of the illumination optical axis 51ax.

The light guide system 3B includes a collector lens 32B, a first diaphragm (incident angle limiting member) 37, the polarizing beam splitter (polarization separation element) 28, a second diaphragm 38, and a polarizer plate 34B.

The collector lens 32B converts each of the sub-light fluxes that form the blue light LB collected by the superimposing lens 12 into a light flux substantially parallel to the principal ray of the sub-light flux. The first diaphragm 37 narrows the converted substantially parallel light fluxes from the collector lens 32B. The blue light LB collected by the superimposing lens 12 is thus incident on the polarizing beam splitter 28 via the collector lens 32B and the first diaphragm 37. At this point, since the illumination light fluxes from the blue light illuminator 51 are substantially one type of linearly polarized (P-polarized, for example) light fluxes having polarization directions substantially aligned with each other by the polarization conversion element 11, the light having passed through the collector lens 32B passes through the polarizing beam splitter 28 and impinges on the reflective liquid crystal panel 4B for blue light. Other collector lenses 32R and 32G are configured in the same manner as the collector lens 32B.

The polarizing beam splitter 28 is a plate-type polarizing beam splitter and has a configuration in which a polarization separation film is provided on a light transmissive substrate. The polarizing beam splitter 28 has a function of transmitting one type of polarized light and reflecting the other type of polarized light. In the present embodiment, the polarizing beam splitter 28 has a function of transmitting P-polarized light and reflecting S-polarized light by way of example. The second diaphragm 38 narrows S-polarized blue light flux reflected off the polarizing beam splitter 28. The light narrowed by the second diaphragm 38 is then guided to the blue light optical sensor 36B.

Further, the polarizing beam splitter 28 receives blue light reflected off the reflective liquid crystal panel 4B, reflects S-polarized blue light, and transmits P-polarized blue light. The S-polarized blue light reflected off the polarizing beam splitter 28 is thus guided to the polarizer plate 34B. The polarizer plate 34B receives the guided blue light and transmits only light polarized in a predetermined direction. The blue light polarized in the predetermined direction is thus guided to the cross dichroic prism 5.

The other polarizing beam splitters (polarization separation elements), the polarizing beam splitter (polarization separation element) 26 and the polarizing beam splitter (polarization separation element) 27, are configured in the same manner as the polarizing beam splitter 28 described above.

As described above, the illumination light fluxes from the blue light illuminator 51 are aligned with each other by the polarization conversion element 11 into substantially P-polarized light fluxes, and the P-polarized blue light passes through the polarizing beam splitter 28 and impinges on the reflective liquid crystal panel 4B for blue light. The light having passed through the polarization conversion element 11 is, however, not all converted into P-polarized light but actually contains S-polarized light. The S-polarized light incident on the polarizing beam splitter 28 is reflected off the polarizing beam splitter 28. The blue light optical sensor 36B is disposed in a position in the optical path of the blue light, specifically, in the optical path of the S-polarized light reflected off the polarizing beam splitter 28.

The light guide system 3R includes a collector lens 32R, a first diaphragm 37, the polarizing beam splitter (polarization separation element) 26, a second diaphragm (incident angle limiting member) 38, and a polarizer plate 34R.

The collector lens 32R converts each of the sub-light fluxes that form the red light LR having passed through the dichroic mirror 25 into a light flux substantially parallel to the principal ray of the sub-light flux. The first diaphragm 37 narrows the converted substantially parallel light fluxes from the collector lens 32R. The red light LR having passed through the dichroic mirror 25 is thus incident on the polarizing beam splitter 26 via the collector lens 32R and the first diaphragm 37. At this point, since the illumination light fluxes from the yellow light illuminator 52 are substantially one type of linearly polarized (P-polarized, for example) light fluxes having polarization directions substantially aligned with each other by the polarization conversion element 11, the light having passed through the collector lens 32R passes through the polarizing beam splitter 26 and impinges on the reflective liquid crystal panel 4R for red light.

The polarizing beam splitter 26 has a function of transmitting P-polarized light and reflecting S-polarized light by way of example. The second diaphragm 38 narrows S-polarized red light flux reflected off the polarizing beam splitter 26. The light narrowed by the second diaphragm 38 is then guided to the red light optical sensor 36R.

Further, the polarizing beam splitter 26 receives red light reflected off the reflective liquid crystal panel 4R, reflects S-polarized red light, and transmits P-polarized red light. The P-polarized red light reflected off the polarizing beam splitter 26 is thus guided to the polarizer plate 34R. The polarizer plate 34R receives the guided red light and transmits only light polarized in a predetermined direction. The red light polarized in the predetermined direction is thus guided to the cross dichroic prism 5.

The light guide system 3G includes a collector lens 32G, a first diaphragm 37, the polarizing beam splitter (polarization separation element) 27, a second diaphragm (incident angle limiting member) 38, and a polarizer plate 34G.

The collector lens 32G converts each of the sub-light fluxes that form the green light LG reflected off the dichroic mirror 25 into a light flux substantially parallel to the principal ray of the sub-light flux. The first diaphragm 37 narrows the converted substantially parallel light fluxes from the collector lens 32G. The green light LG reflected off the dichroic mirror 25 is thus incident on the polarizing beam splitter 27 via the collector lens 32G and the first diaphragm 37. At this point, since the illumination light fluxes from the yellow light illuminator 52 are substantially one type of linearly polarized (P-polarized, for example) light fluxes having polarization directions substantially aligned with each other by the polarization conversion element 11, the light having passed through the collector lens 32G passes through the polarizing beam splitter 27 and impinges on the reflective liquid crystal panel 4G for green light.

The polarizing beam splitter 27 transmits P-polarized light and reflects S-polarized light by way of example. The second diaphragm 38 narrows S-polarized green light fluxes reflected off the polarizing beam splitter 27. The light narrowed by the second diaphragm 38 is then guided to the green light optical sensor 36G.

Further, the polarizing beam splitter 27 receives green light reflected off the reflective liquid crystal panel 4G, reflects S-polarized green light, and transmits P-polarized green light. The S-polarized green light reflected off the polarizing beam splitter 27 is thus guided to the polarizer plate 34G. The polarizer plate 34G receives the guided green light and transmits only light polarized in a predetermined direction. The green light polarized in the predetermined direction is thus guided to the cross dichroic prism 5.

Each of the reflective liquid crystal panels 4R, 4G, and 4B modulates the illumination light in accordance with an image signal. The reflective liquid crystal panels 4R and 4G are light modulators to be illuminated with light from the yellow light illuminator 52. The reflective liquid crystal panel 4B is a light modulator to be illuminated with light from the blue light illuminator 51.

Each of the reflective liquid crystal panels 4R, 4G, and 4B includes the following components: a pair of substrates that sandwich a liquid crystal layer; and a reflection layer (or reflection electrode) disposed on the substrate that faces the light-incident-side substrate. The reflective liquid crystal panels 4R, 4G, and 4B have heat dissipation fins 33R, 33G, and 33B each disposed on the surface facing away from the light-incident-side surface, as shown in FIG. 1.

The cross dichroic prism 5 is an optical element that combines optical images formed by respective modulated color light fluxes having exited out of the polarizer plates 34R, 34G, and 34B to form a color image. The cross dichroic prism 5 is formed by bonding four rectangular prisms and thus has a substantially square shape when viewed from above. Dielectric multilayer films are formed on the substantially X-shaped interfaces between the bonded rectangular prisms. The dielectric multilayer film formed on one of the substantially X-shaped interfaces reflects the blue light LB, whereas the dielectric multilayer film formed on the other interface reflects the red light LR. The dielectric multilayer films deflect the blue light LB and the red light LR, which then travel in the same direction as the green light LG, which passes through the cross dichroic prism 5. The three color light fluxes are thus combined with one another.

A color image formed by the light having exited out of the cross dichroic prism 5 is enlarged and projected through the projection system 6 and forms an image on the screen SCR.

The controller 64 adjusts the amount of light from the excitation laser diodes 62 in accordance with the intensity of the red light detected with the red light optical sensor 36R. The controller 64 adjusts the amount of light from the blue laser diodes 59 in accordance with the intensity of the blue light detected with the blue light optical sensor 36B. The controller 64 further controls the reflectance of each pixel in the reflective liquid crystal panels 4R, 4G, and 4B in accordance with a video signal representing inputted video images.

The video signal inputted to the controller 64 may be a plurality of image signals representing images of successive frames or may be an image signal representing an image of a single frame.

The optical configuration in each embodiment is not limited to the optical configuration shown in FIG. 1 or the optical configurations shown in FIGS. 6 and 10, which will be described later. That is, the fluorophore substrate 61 may instead be of reflective type, and whether or not the diffuser plate is present and other detailed optical configurations are simply design-related matters. In other words, the optical configuration is not limited to a specific one. Further, the light source configuration may instead be based on red (R), green (G), and blue (B) three LEDs. Moreover, each of the light modulators may instead be a transmissive liquid crystal panel or a DMD (digital mirror device). The arrangement of the red light optical sensor 36R, the green light optical sensor 36Q and the blue light optical sensor 36B is not limited to that shown in FIG. 1 or those shown in FIGS. 6 and 10, which will be described later, and they may be disposed in any positions where the amounts of light from the Y and B light sources can be detected.

Figure 2:
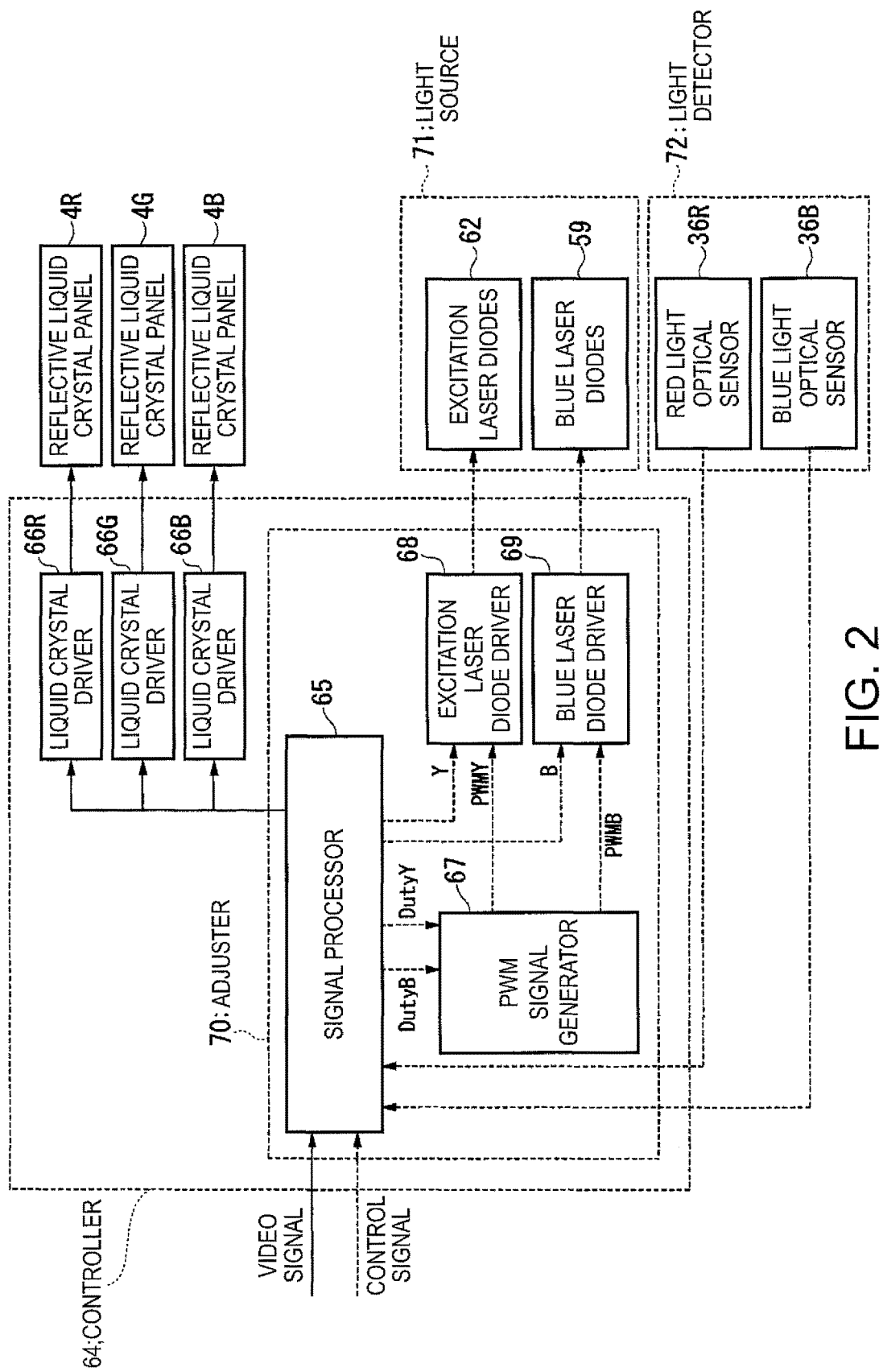
FIG. 2 is a schematic block diagram showing the configuration of a controller in the first embodiment.

FIG. 2 is a schematic block diagram showing the configuration of the controller 64 in the first embodiment. FIG. 2 shows not only the controller 64 but also a light source 71, which includes the blue laser diodes 59 and the excitation laser diodes 62, and a light detector 72, which includes the red light optical sensor 36R, the green light optical sensor 36G (not shown), and the blue light optical sensor 36B.

The controller 64 includes liquid crystal drivers 66R, 66G, and 66B and an adjuster 70.

The adjuster 70 adjusts the output from the light source 71 in accordance with the video signal. The output is, for example, expressed by brightness. The brightness is, for example, light intensity, luminance, or lightness. The adjuster 70 includes a signal processor 65, a PWM signal generator 67, an excitation laser diode driver 68, and a blue laser diode driver 69.

The signal processor 65 receives the video signal and a control signal. The signal processor 65 applies a variety of types of image quality correction to the received video signal and outputs signals having undergone the image quality correction to the liquid crystal drivers 66R, 66G, and 66B. The liquid crystal drivers 66R, 66G, and 66B use the signals inputted from the signal processor 65 to control the reflectance of the reflective liquid crystal panels 4R, 4G, and 4B.

The signal processor 65 further performs light control on the light source 71 in accordance with the received control signal. The control signal is a signal containing information on display of a user setting or a color mode inputted by a user through a menu screen (not shown) displayed on the screen SCR (FIG. 1). The amount of light from the light source 71 is thus controlled based on the brightness and color setting changed in accordance with the user setting or the color mode. Further, the signal processor 65 performs the light control in adaptation to the brightness (grayscale) of the received video signal.

A specific example of the light control performed by the signal processor 65 will subsequently be described. The signal processor 65 receives a red light intensity signal from the red light optical sensor 36R. The signal processor 65 then, for example, corrects a red light optical sensor present value presented by the red light intensity signal. The signal processor 65 refers to the corrected red light optical sensor value produced in the correction operation to determine an excitation duty value DutyY indicative of a duty according to which the excitation laser diodes 62 emit light. The signal processor 65 outputs information representing the determined excitation duty value DutyY to the PWM signal generator 67.

The signal processor 65 receives a Hue light intensity signal from the blue light optical sensor 36B. The signal processor 65 then, for example, corrects a blue light optical sensor present value presented by the blue light intensity signal. The signal processor 65 refers to the corrected blue light optical sensor value produced in the correction operation to determine a blue duty value DutyB indicative of a duty according to which the blue laser diodes 59 emit light. The signal processor 65 outputs information representing the determined blue duty value DutyB to the PWM signal generator 67.

To drive the excitation laser diodes 62 by using a constant current, the signal processor 65 further outputs drive current amplitude information representing the amplitude Y of the drive current to the excitation laser diode driver 68. The excitation laser diode driver 68 can thus drive the excitation laser diodes 62 based not only on PWM drive but also on constant current drive using a constant current having the amplitude Y.

Similarly, to drive the blue laser diodes 59 by using a constant current, the signal processor 65 further outputs drive current amplitude information representing the amplitude B of the drive current to the blue laser diode driver 69. The blur laser diode driver 69 can thus drive the blue laser diodes 59 based not only on PWM drive but also on constant current drive using a constant current having the amplitude B.

The PWM signal generator 67 used the excitation duty value DutyY to generate a PWMY signal corresponding to light-on and light-off of the excitation laser diodes 62. The PWM signal generator 67 outputs the generated PWMY signal to the excitation laser diode driver 68.

Similarly, the PWM signal generator 67 uses the blue duty value DutyB to generate a PWMB signal corresponding to light-on and light-off of the blue laser diodes 59. The PWM signal generator 67 outputs the generated PWMB signal to the blue laser diode driver 69.

The excitation laser diode driver 68 performs ON/OFF control on the excitation laser diodes 62 based on the waveform of the PWMY signal. The excitation laser diode driver 68 may alternatively drive the excitation laser diodes 62 by using the constant current having the amplitude Y presented by the drive current amplitude information inputted from the signal processor 65.

Further, the blue laser diode driver 69 performs ON/OFF control on the blue laser diodes 59 based on the waveform of the PWMB signal. The blue laser diode driver 69 may alternatively drive the blue laser diodes 59 by using the constant current having the amplitude B presented by the drive current amplitude information inputted from the signal processor 65.

Figure 3:
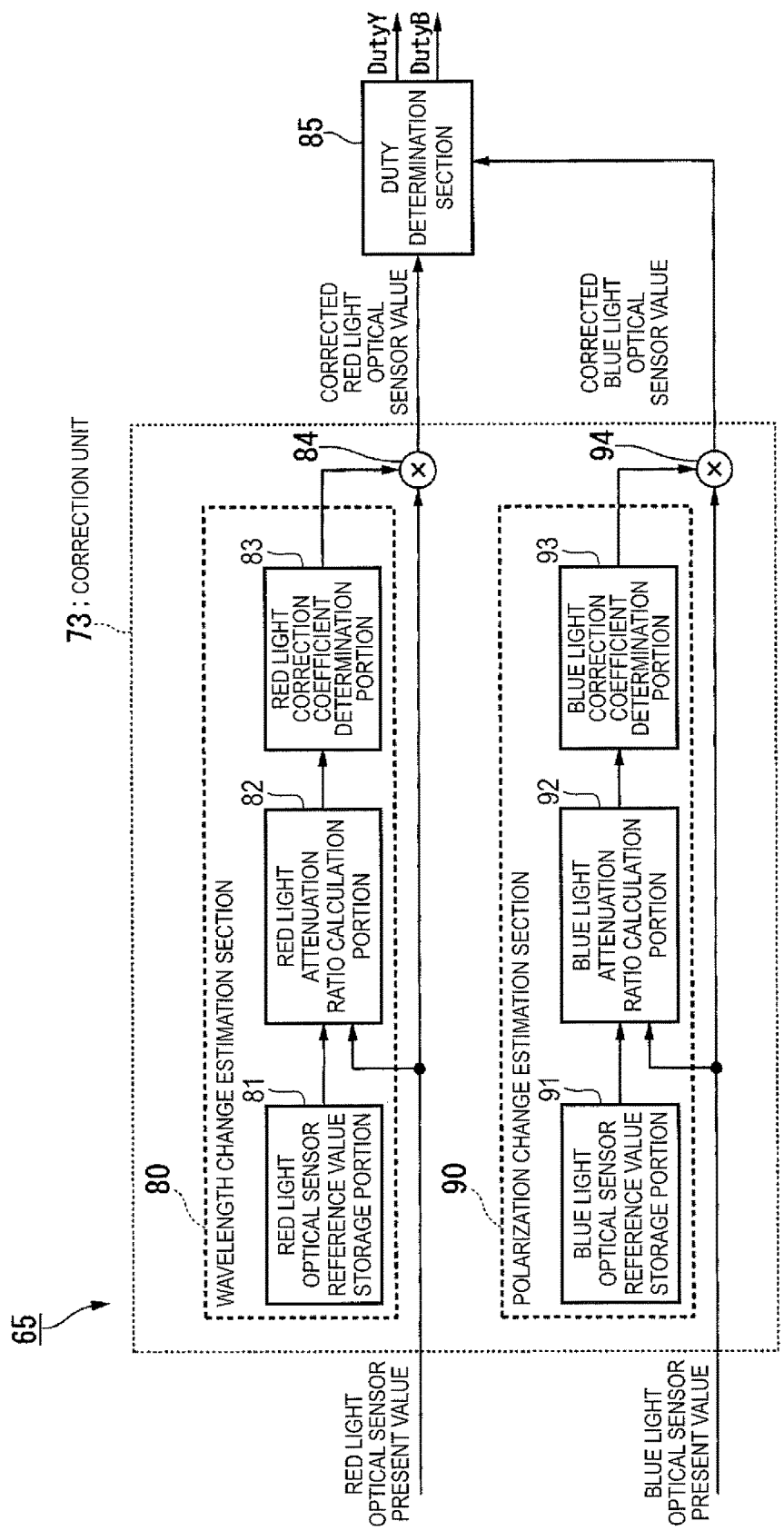
FIG. 3 is a schematic block diagram showing the configuration of a signal processor in the first embodiment.

FIG. 3 is a schematic block diagram showing the configuration of the signal processor 65 in the first embodiment. The signal processor 65 corrects the red light optical sensor value and the blue light optical sensor value at a predetermined timing. The signal processor 65 includes a wavelength change estimation section 80, a red light multiplication section 84, a duty determination section 85, a polarization change estimation section 90, and a blue light multiplication section 94.

The wavelength change estimation section 80 estimates a change in the wavelength of the red light LR. The wavelength change estimation section 80 includes a red light optical sensor reference value storage portion 81, a red light attenuation ratio calculation portion 82, and a red light correction coefficient determination portion 83. The red light optical sensor reference value storage portion 81 stores a red light optical sensor reference value. The red light optical sensor reference value is, for example, a red light optical sensor value at the time of shipment of the projector 50.

The red light attenuation ratio calculation portion 82 reads the red light optical sensor reference value from the red light optical sensor reference value storage portion 81. The red light attenuation ratio calculation portion 82 divides a red light optical sensor present value by the red light optical sensor reference value to calculate a red light attenuation ratio. The red light attenuation ratio calculation portion 82 then outputs information representing the red light attenuation ratio to the red light correction coefficient determination portion 83.

The red light correction coefficient determination portion 83 determines a red light correction coefficient in accordance with the red light attenuation ratio. Specifically, it is, for example, assumed that the red light correction coefficient determination portion 83 stores a table that contains red light attenuation ratios and red light correction coefficients related to each other. In this case, the red light correction coefficient determination portion 83 determines the red light attenuation ratio, for example, by reading from the table a red light correction coefficient corresponding to the red light correction coefficient represented by the information inputted from the red light attenuation ratio calculation portion 82. The red light correction coefficient according to the red light attenuation ratio is thus determined. The red light correction coefficient determination portion 83 outputs information representing the determined red light correction coefficient to the red light multiplication section 84.

The red light multiplication section 84 calculates a corrected red light optical sensor value by multiplying the red light optical sensor present value by the red light correction coefficient represented by the information inputted from the red light correction coefficient determination portion 83. An error in the red light optical sensor present value due to a change in the wavelength of the yellow light LY outputted from the yellow light illuminator 52 (FIG. 1) is thus corrected.

As described above, when the red light optical sensor value decreases, the wavelength change estimation section 80 estimates that the amount of light incident on the fluorophore substrate 61 has decreased and the wavelength of the light outputted from the fluorophore substrate 61 has changed. As a result, the wavelength change estimation section 80 determines a red light correction coefficient that corrects an error between the luminance of the red light (or G light, Y light) that forms a projection image and the output from the red light optical sensor 36R that is caused by a difference between the spectral sensitivity characteristic of the red light optical sensor 36R and a spectral luminous efficiency function, which is the spectral sensitivity characteristic of a human eye. The red light correction coefficient can also correct an error between the luminance of the red light (or G light, Y light) that forms a projection image and the output from the red light optical sensor 36R that is caused by the wavelength characteristics of the polarization separation elements and other optical elements. The wavelength change estimation section 80 can then multiply the red light optical sensor present value by the correction coefficient to produce a corrected red light optical sensor value.

The duty determination section 85 determines the excitation duty value DutyY and the blue duty value DutyB in accordance with the corrected red light optical sensor value and a corrected blue light optical sensor value. In this process, the duty determination section 85 determines the excitation duty value DutyY and the blue duty value DutyB in such a way that the ratio between the red light intensity and the blue light intensity is a predetermined target value.

Specifically, for example, the duty determination section 85 determines the excitation duty value DutyY and the blue duty value DutyB in such a way that the intensity of the light from high-light-intensity laser diodes is changed to be equal to the intensity of the light from low-light-intensity laser diodes. The duty determination section 85 outputs information representing the excitation duty value DutyY and information representing the blue duty value DutyB to the PWM signal generator 67. The duty determination section 85 can thus control the amount of light emitted from the excitation laser diodes 62 and the amount of light emitted from the blue laser diodes 59.

A margin may be added to the optical output from the blue laser diodes 59 in preparation for a decrease in the amount of light from the blue laser diodes 59. In this case, the duty determination section 85 may determine the blue duty value DutyB in such a way that the light intensity of the light from the blue laser diodes 59 increases.

Alternatively, the duty determination section 85 may determine the excitation duty value DutyY and the blue duty value DutyB in such a way that the intensity of the light from low-light-intensity laser diodes is changed to be equal to the intensity of the light from high-light-intensity laser diodes.

It is assumed in the present embodiment that to acquire optical sensor values for correction of the color balance of the light source 71 by way of example, a predetermined sequence is applied but video signal adaptive light control or any other similar control is not be performed.

The polarization change estimation section 90 estimates a change in the polarization of the blue light LB. The polarization change estimation section 90 includes a blue light optical sensor reference value storage portion 91, a blue light attenuation ratio calculation portion 92, and a blue light correction coefficient determination portion 93.

The blue light optical sensor reference value storage portion 91 stores a blue light optical sensor reference value. The blue light optical sensor reference value is, for example, a blue light optical sensor value at the time of shipment of the projector 50.

The blue light attenuation ratio calculation portion 92 reads the blue light optical sensor reference value from the blue light optical sensor reference value storage portion 91. The blue light attenuation ratio calculation portion 92 divides a blue light optical sensor present value by the blue light optical sensor reference value to calculate a blue light attenuation ratio. The blue light attenuation ratio calculation portion 92 then outputs information representing the blue light attenuation ratio to the blue light correction coefficient determination portion 93.

The blue light correction coefficient determination portion 93 determines a blue light correction coefficient in accordance with the blue light attenuation ratio represented by the information inputted from the blue light attenuation ratio calculation portion 92. Specifically, it is, for example, assumed that the blue light correction coefficient determination portion 93 stores a table that contains blue light attenuation ratios and blue light correction coefficients related to each other. In this case, the blue light correction coefficient determination portion 93 determines the blue light attenuation ratio, for example, by reading a blue light correction coefficient corresponding to the blue light attenuation ratio represented by information inputted from the blue light attenuation ratio calculation portion 92. The blue light correction coefficient according to the blue light attenuation ratio is thus determined. The blue light correction coefficient determination portion 93 outputs information representing the determined blue light correction coefficient to the blue light multiplication section 94.

The blue light multiplication section 94 calculates a corrected blue light optical sensor value by multiplying the blue light optical sensor present value by the blue light correction coefficient represented by the information inputted from the blue light correction coefficient determination portion 93. An error in the blue light optical sensor present value due to the change in the polarization of the blue light LB is thus corrected.

As described above, when the blue light optical sensor value decreases, the polarization change estimation section 90 estimates that the temperature characteristics and other factors of the polarization conversion element 11 (FIG. 1) have changed the polarization state of the blue light after the polarization conversion. The polarization change estimation section 90 then determines a correction coefficient that allows correction of an error that causes a change in the blue light optical sensor present value to be greater than a change in the amount of light emitted from the blue laser diodes 59. The polarization change estimation section 90 then multiplies the blue light optical sensor present value by the determined correction coefficient to produce a corrected blue light optical sensor value.

In the present, embodiment, since both the wavelength change estimation section 80 and the polarization change estimation section 90 correct optical sensor values based on how much the optical sensor values are attenuated, causes of the errors associated with the optical sensors may be tabulated into a single table, and the single table may be used to determine correction values. Further, in the present embodiment, correction values are determined based on how much optical sensor values are attenuated from the reference values, by way of example. Correction values may alternatively be determined by using the absolute values of optical sensor values. The correction described above allows the projector 50 to relate with high precision an optical sensor output to the amounts of light outputted from the corresponding illuminator (blue light illuminator 51, for example).

Figure 4:
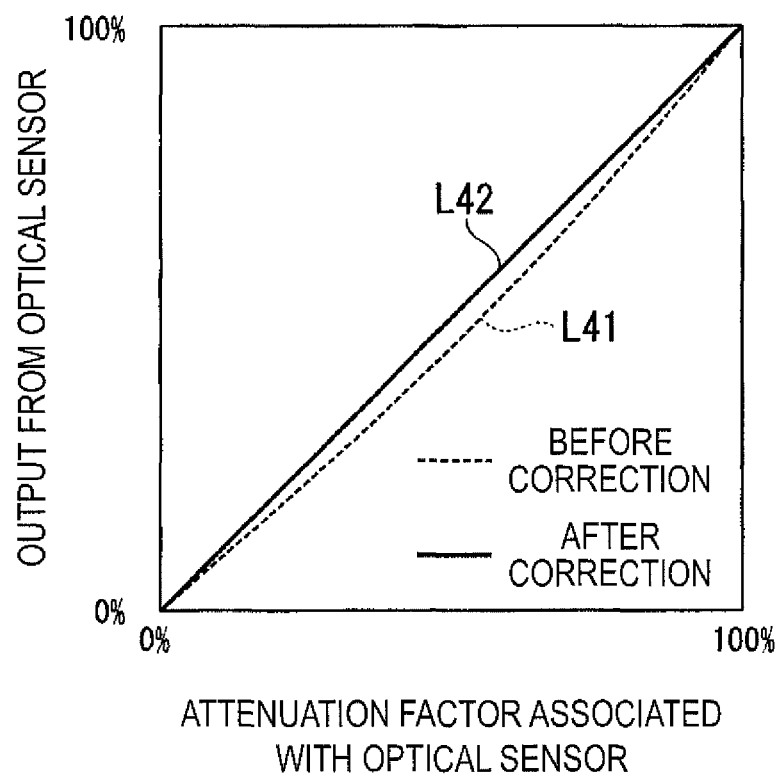
FIG. 4 is an example of comparison of a graph showing the relationship between the output from an optical sensor and the attenuation factor associated with the optical sensor before correction made by an adjuster with a graph showing the relationship after the correction.

FIG. 4 is an example of comparison of a graph showing the relationship between the output from an optical sensor and the attenuation factor associated with the optical sensor before the correction made by the adjuster 70 (FIG. 2) with a graph showing the relationship after the correction. The vertical axis of FIG. 4 represents the optical sensor output, and the horizontal axis represents the attenuation factor associated with the optical sensor. The attenuation factor associated with the optical sensor is calculated by dividing a present value of the optical sensor output by a reference value of the optical sensor output and multiplying the resultant value by 100. In the example shown in FIG. 4, a curve L41, which is convex downward, shows the relationship before the adjuster 70 corrects the optical sensor value, whereas a straight line L42 shows the relationship after the correction. That is, the optical sensor output is linearly proportional to the attenuation factor after the correction.

Figure 5:
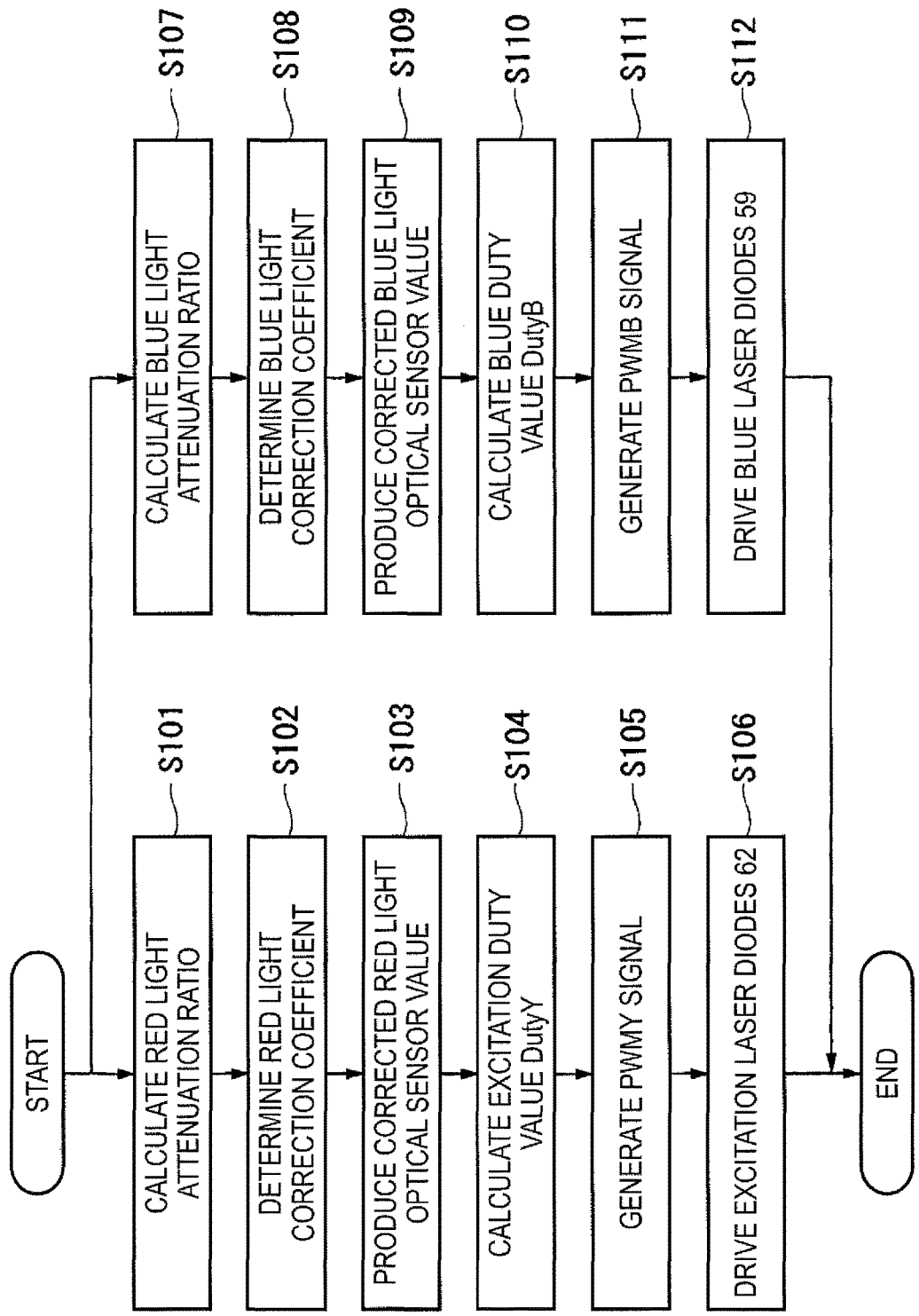
FIG. 5 is a flowchart showing an example of the procedure of processes carried out by the controller in the first embodiment.

FIG. 5 is a flowchart showing an example of the procedure of processes carried out by the controller in the first embodiment. The controller 64 concurrently carries out processes in steps S101 to S106 and those in steps S107 to S112.

Step S101

The red light attenuation ratio calculation portion 82 first divides a red light optical sensor present value by the red light optical sensor reference value to calculate the red light attenuation ratio.

Step S102

The red light correction coefficient determination portion 83 then determines the red light correction coefficient in accordance with the red light attenuation ratio.

Step S103

The red light multiplication section 84 then multiplies the red light optical sensor present value by the red light correction coefficient to produce a corrected red light optical sensor value.

Step S104

The duty determination section 85 then calculates the excitation duty value DutyY based on the corrected red light optical sensor value, Step S105

The PWM signal generator 67 then uses the excitation duty value DutyY to produce the PWMY signal corresponding to the light-on and light-off of the excitation laser diodes 62.

Step S106

The excitation laser diode driver 68 then uses the PWMY signal to drive the excitation laser diodes 62.

Step S107

The blue light attenuation ratio calculation portion 92 first divides a blue light optical sensor present value by the blue light optical sensor reference value to calculate the blue light attenuation ratio.

Step S108

The blue light correction coefficient determination portion 93 then determines the blue light correction coefficient in accordance with the blue light attenuation ratio.

Step S109

The blue light multiplication section 94 then multiplies the blue light optical sensor value by the blue light correction coefficient to produce a corrected blue light optical sensor value.

Step S110

The duty determination section 85 then calculates the blue duty value DutyB based on the corrected blue light optical sensor value.

Step S111

The PWM signal generator 67 then uses the blue duty value DutyB to produce the PWMB signal corresponding to light-on and light-off of the blue laser diodes 59.

Step S112

The blue laser diode driver 69 then uses the PWMB signal to drive the blue laser diodes 59. The processes in the present flowchart are thus completed.

As described above, the red light optical sensor 36R can detect the amount of light emitted from the excitation laser diodes 62 but cannot detect a change in chromaticity. When the wavelength of the light from the excitation laser diodes 62 changes, the spectral sensitivity characteristic of the corresponding optical sensor causes the proportion of a change in the optical sensor output to differ from the proportion of a change in the amount of light emitted from the excitation laser diodes 62. As a result, an image of desired brightness cannot be displayed.

In contrast, in the first embodiment, the wavelength change estimation section 80 (FIG. 3) calculates the red light correction coefficient, which allows correction of an error in the proportion of a change in the optical sensor output due to the change in the wavelength of the light from the excitation laser diodes 62. The red light multiplication section 84 then multiplies a red light optical sensor present value by the calculated red light correction coefficient to correct the red light optical sensor present value. As a result, the excitation duty value DutyY is determined in accordance with the corrected red light optical sensor value, and the excitation laser diodes 62 are driven based on a duty according to the corrected red light optical sensor value. The adjuster 70 can thus adjust the amount of light from the excitation laser diodes 62 to allow the brightness of a displayed image to be close to desired brightness.

Further, the temperature characteristics and other factors of an optical element change the polarization state of light, which causes the proportion of a change in the optical sensor output to differ from the proportion of a change in the amount of light emitted from the blue laser diodes 59. As a result, an image of desired brightness cannot be displayed.

In contrast, in the first embodiment, the polarization change estimation section 90 calculates the blue light correction coefficient, which allows correction of an error in the proportion of a change in the optical sensor output due to the change in the polarization of the light from the blue laser diodes 59. The blue light multiplication section 94 then multiplies a blue light optical sensor present value by the calculated blue light correction coefficient to correct the blue light optical sensor present value. As a result, the blue duty value DutyB is determined in accordance with the corrected blue light optical sensor value, and the blue laser diodes 59 are driven based on a duty according to the corrected blue light optical sensor value. The adjuster 70 can thus adjust the amount of light from the blue laser diodes 59 to allow the brightness of a displayed image to be close to desired brightness.

As described above, in the first embodiment, the adjuster 70 estimates light state information representing the state of light (wavelength, polarization, for example) and adjusts the output from the light source 71 based on the estimated light state information. The polarizing beam splitter 26 separates the light incident thereon from the excitation laser diodes 62 into light fluxes polarized in different directions. Further, the red light optical sensor 36R provided in the light detector 72 receives one of the light fluxes separated by the polarizing beam splitter 26 and detects light brightness information on the brightness of light different from light to be projected on the screen. Further, the polarizing beam splitter 28 separates the light incident thereon from the blue laser diodes 59 into light fluxes polarized in different directions. Similarly, the blue light optical sensor 36B provided in the light detector 72 receives one of the light fluxes separated by the polarizing beam splitter 28 and detects light brightness information on the brightness of light different from light to be projected on the screen. As a result, the projector 50, in which the light detector 72 detects light brightness information on the polarized light that is not projected on the screen, can detect the light brightness information without lowering the amount of light to be projected on the screen. Further, the polarizing beam splitter 26 provided in the projector 50 is intended to transmit only P-polarized light and project only the P-polarized light. The light detector 72, which is configured to detect S-polarized light that is reflected off the polarizing beam splitter 26 and is hence not used for projection, can therefore detect the light brightness information without adding any new component only for detecting the light brightness information.

The adjuster 70 corrects the light brightness information detected with the light detector 72 based on the light state information and refers to the corrected light brightness information to adjust the output from the light source 71. The adjuster 70 further refers to the light brightness information detected with the light detector 72 to estimate a change in the wavelength of the light and adjusts the output from the light source 71 based on the estimated change in the wavelength of the light. As a result, the adjuster 70 allows the brightness of a displayed image to be close to desired brightness by adjusting a shift in the output from the light source due to the change in the wavelength of the light.

The adjuster 70 further refers to the light brightness information detected with the light detector 72 to estimate a change in the polarization state of the light and adjusts the output from the light source 71 based on the estimated change in the polarization state of the light. As a result, the projector 50 allows the brightness of the displayed image to be close to the desired brightness by adjusting a shift in the output from the light source due to the change in the polarization of the light.

Second Embodiment

A second embodiment will subsequently be described. The wavelength of the light from the light source 71 changes differently between a case where a light emission duty value is controlled and a case where the output from the light source 71 decreases. For example, the temperature of the fluorophore substrate 61 changes when the light emission duty value is controlled, but the peak amount of light (optical density) does not change, whereas both the temperature of the fluorophore substrate 61 and the peak amount of light change when the output from the excitation laser diodes 62 decreases. As a result, the wavelength of the light changes differently between the case where the light emission duty value is controlled and the case where the output from the light source 71 decreases.

In view of the fact described above, a projector 50b according to the second embodiment differs from the projector 50 according to the first embodiment in terms of the following points: The projector 50b determines a first correction coefficient based on a light emission duty value according to which the excitation laser diodes 62 emit light (hereinafter also referred to as yellow light source light emission Duty). The projector 50b then calculates a (sensor present value/sensor reference value)/Duty ratio to determine the proportion of a change in the amount of light other than the change in the amount of light due to the light emission duty value. The Duty ratio is one hundredth of the light emission duty value. For example, when the light emission duty value is 50%, the Duty ratio is 0.5. The projector 50b determines a second correction coefficient in accordance with the proportion of the change in the amount of light other than the change in the amount of light due to the light emission duty value. The projector 50b multiplies an optical sensor value by the sum of the first correction coefficient and the second correction coefficient to correct the optical sensor value. The thus configured projector 50b can correct the optical sensor output more precisely than in the first embodiment.

The dividing operation described above is only applicable to a case where the relationship between the Duty ratio and the brightness can be considered to have a linear relationship. More accurately, the projector 50b preferably refers to a table representing the relationship between the Duty ratio and the brightness ratio to determine a brightness ratio corresponding to the Duty ratio and normalizes the Duty ratio by the brightness ratio. The optical sensor output can thus be corrected more precisely.

Figure 6:
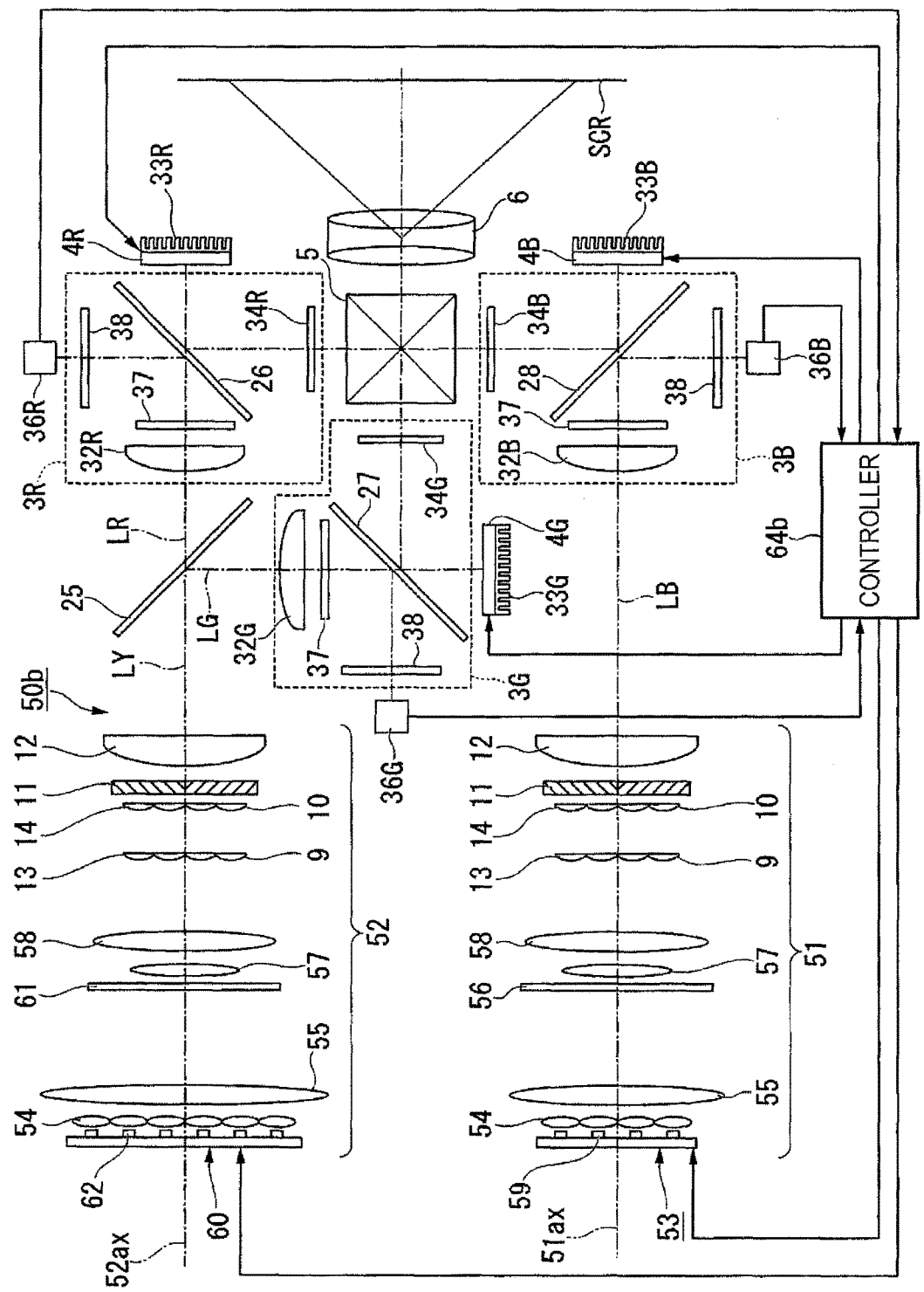
FIG. 6 is a schematic configuration diagram showing the configuration of a projector in a second embodiment.

FIG. 6 is a schematic configuration diagram showing the configuration of the projector 50b in the second embodiment. The elements common to those in FIG. 1 have the same reference characters, and no specific description thereof will be made. The configuration of the projector 50b in the second embodiment differs from the configuration of the projector 50 in the first embodiment in that the controller 64 is replaced with a controller 64b.

Figure 7:
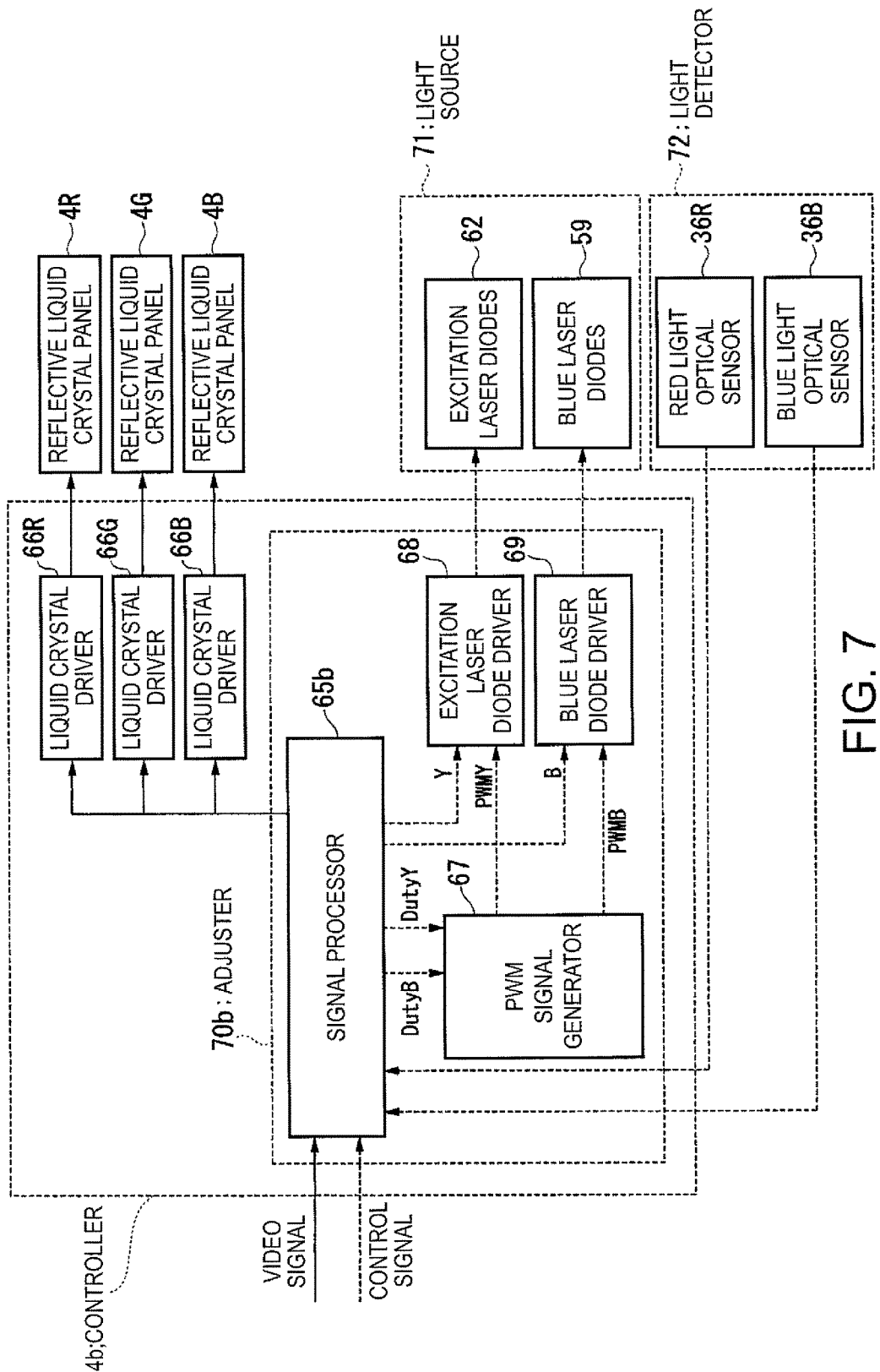
FIG. 7 is a schematic block diagram showing the configuration of a controller in the second embodiment.

FIG. 7 is a schematic block diagram showing the configuration of the controller 64b in the second embodiment. The elements common to those in FIG. 2 have the same reference characters, and no specific description thereof will be made. The configuration of the controller 64b in the second embodiment differs from the configuration of the controller 64 in the first embodiment in that the signal processor 65 in the adjuster 70 is replaced with a signal processor 65b in an adjuster 70b.

Figure 8:
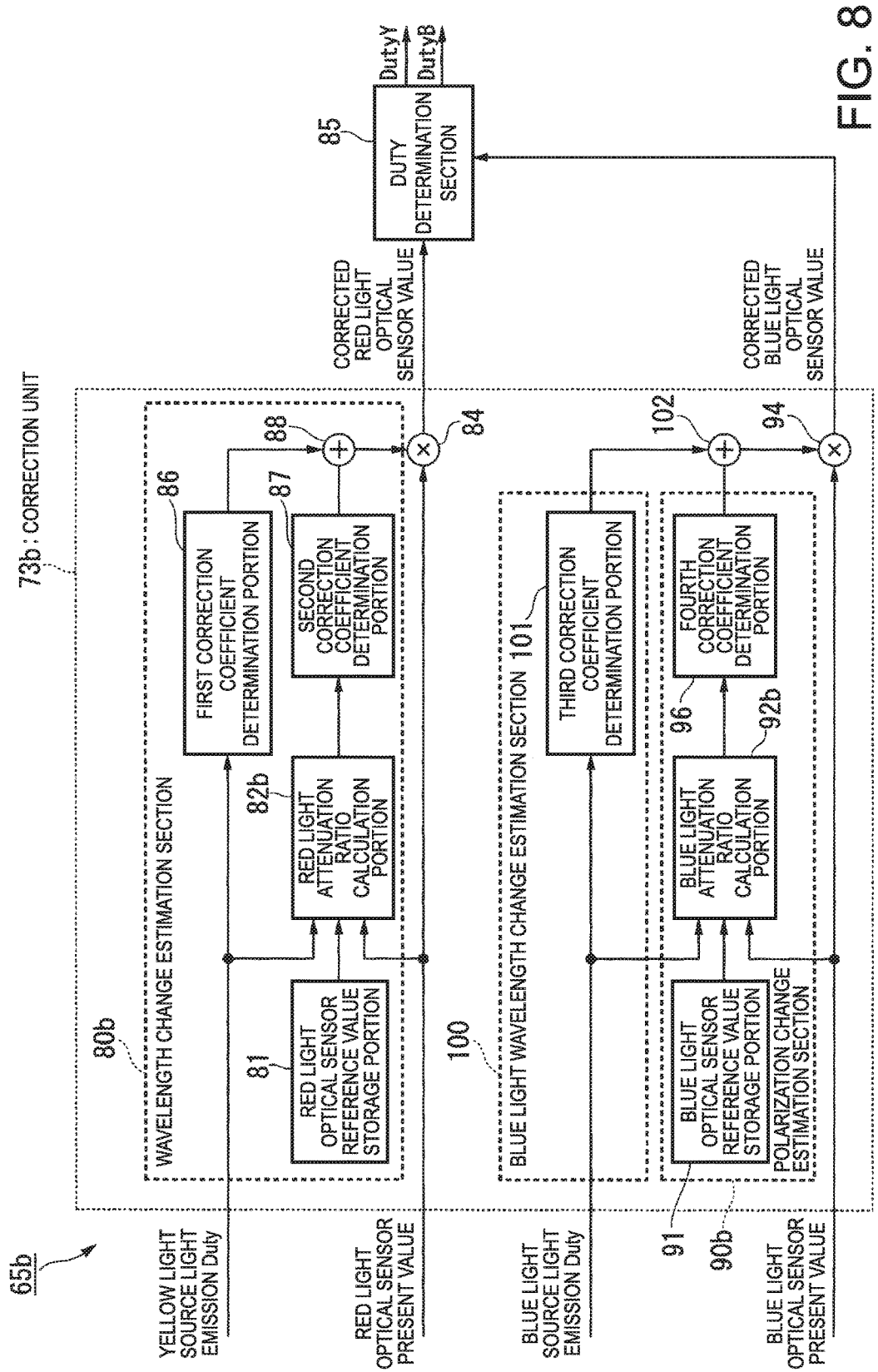
FIG. 8 is a schematic block diagram showing the configuration of a signal processor in the second embodiment.

FIG. 8 is a schematic block diagram showing the configuration of the signal processor 65b in the second embodiment. The elements common to those in FIG. 3 have the same reference characters, and no specific description thereof will be made. Unlike the signal processor 65 in the first embodiment, the signal processor 65b corrects a red light optical sensor value and a blue light optical sensor value in a realtime manner by way of example. The signal processor 65b includes a wavelength change estimation section 80b, a red light multiplication section 84, a duty determination section 85, a polarization change estimation section 90b, a blue light wavelength change estimation section 100, a blue light addition section 102, and a blue light multiplication section 94.

The wavelength change estimation section 80b includes a red light optical sensor reference value storage portion 81, a red light attenuation ratio calculation section 82b, a first correction coefficient determination portion 86, a second correction coefficient determination portion 87, and a red light addition portion 88.

The red light attenuation ratio calculation portion 82b calculates the proportion of a change in the amount of red light other than a change in the amount of red light due to the light emission duty value in accordance, for example, with (red light optical sensor present value/red light optical sensor reference value)/Duty ratio. The red light attenuation ratio calculation portion 82b outputs information representing the calculated proportion of the change in the amount of red light described above to the second correction coefficient determination portion 87.

The first correction coefficient determination portion 86 determines the first correction coefficient in accordance with an inputted yellow light source light emission Duty. The yellow light source light emission Duty is a duty for the excitation laser diodes 62. The first correction coefficient is substantially linearly proportional to the yellow light source light emission Duty. The reason for this is that the wavelength changes only with temperature. The first correction coefficient determination portion 86 outputs information representing the determined first correction coefficient to the red light addition portion 88.

A description will subsequently made of an example of specific processes carried out by the first correction coefficient determination portion 86. The first correction coefficient determination portion 86 stores, for example, a table T1, which contains values of the yellow light source light emission Duty and first correction coefficients related to each other. The first correction coefficient determination portion 86 determines the first correction coefficient, for example, by reading a first correction coefficient according to the inputted yellow light source light emission Duty from the table T1.

The table T1 is determined, for example, by evaluating an error between a red light optical sensor present value and the luminance of the screen while actually changing the duty for the excitation laser diodes 62. In this process, when the red light optical sensor present value is not corrected by using the first correction coefficient because the red light optical sensor present value is corrected by using the sum of the first correction coefficient and the second correction coefficient, which will be described later, the table T1 is so created that the first correction coefficient is zero.

The second correction coefficient determination portion 87 determines the second correction coefficient in accordance with the proportion of a change in the amount of red light represented by the information inputted from the red light attenuation ratio calculation portion 82*b*. The second correction coefficient changes quadratically with the red light optical sensor present value. The reason for this is that the wavelength changes with two factors, the temperature and the optical density. The second correction coefficient determination portion 87 outputs information representing the determined second correction coefficient to the red light addition portion 88.

A description will subsequently be made of an example of specific processes carried out by the second correction coefficient determination portion 87. It is assumed that the second correction coefficient determination portion 87 stores, for example, a table T2, which contains the proportions of changes in the amount of red light other than changes in the amount of red light due to the light emission duty value and second correction coefficients related each other. The second correction coefficient determination portion 87 determines the second correction coefficient, for example, by reading a second correction coefficient according to the inputted proportion of the change in the amount of red light described above from the table T2.

It is noted that the first correction coefficient is greater than the second correction coefficient. The reason for this is that the first correction coefficient does not cancel both errors resulting from the two causes.

The red light addition portion 88 adds the first correction coefficient represented by the information inputted from the first correction coefficient determination portion 86 to the second correction coefficient represented by the information inputted from the second correction coefficient determination portion 87. The red light addition portion 88 outputs information representing an added correction coefficient produced in the addition operation to the red light multiplication section 84.

The red light multiplication section 84 multiplies the red light optical sensor present value by the added correction coefficient represented by the information inputted from the red light addition portion 88 and uses the value produced in the multiplication operation as a corrected red light optical sensor value. The signal processor 65*b* can therefore correct the red light optical sensor present value in accordance not only with the yellow light source light emission Duty but also with the proportion of the change in the amount of red light other than the change in the amount of red light due to the yellow light source light emission Duty. The red light multiplication section 84 then outputs information representing the resultant corrected red light optical sensor value to the duty determination section 85.

The polarization change estimation section 90*b* estimates a change in the polarization of the blue light LB. The polarization change estimation section 90*b* includes a blue light optical sensor reference value storage portion 91, a blue light attenuation ratio calculation portion 92*b*, and a fourth correction coefficient determination portion 96.

The blue light attenuation ratio calculation portion 92*b* calculates the proportion of a change in the amount of blue light other than a change in the amount of blue light due to the blue light emission duty value in accordance, for example, with a (blue light optical sensor present value/blue light optical sensor reference value)/blue light source Duty ratio. The blue light source Duty ratio is a value produced by dividing the duty value for the blue laser diodes 59 (hereinafter also referred to as blue light source light emission Duty) by 100. The blue light attenuation ratio calculation portion 92*b* outputs information representing the calculated proportion of the change in the amount of blue light described above to the fourth correction coefficient determination portion 96.

The fourth correction coefficient determination portion 96 determines a fourth correction coefficient according to the proportion of the change in the amount of blue light represented by the information inputted from the blue light attenuation ratio calculation portion 92*b*. The fourth correction coefficient changes quadratically with a blue light optical sensor value. The reason for this is that a change in the polarization state is dominant. The fourth correction coefficient determination portion 96 outputs information representing the determined fourth correction coefficient to the blue light addition section 102.

A description will be made of an example of specific processes carried out by the fourth correction coefficient determination portion 96. It is assumed that the fourth correction coefficient determination portion 96 stores, for example, a table T4, which contains the proportions of changes in the amount of blue light other than changes in the amount of blue light due to the blue light emission duty value and fourth correction coefficients related to each other. The fourth correction coefficient determination portion 96 determines the fourth correction coefficient, for example, by reading a fourth correction coefficient according to the inputted proportion of the change in the amount of blue light described above from the table T4.

The blue light wavelength change estimation section 100 estimates a change in the wavelength of the blue light LB based on the blue light source light emission Duty. The blue light wavelength change estimation section 100 includes a third correction coefficient determination portion 101.

The third correction coefficient determination portion 101 calculates a third correction coefficient in accordance with the blue light source light emission Duty. The third correction coefficient changes quadratically with the blue light source light emission Duty. The reason for this is that two causes, a change in the wavelength and a change in the polarization state, are mixed. The third correction coefficient determination portion 101 outputs information representing the calculated third correction coefficient to the blue light addition section 102.

The third correction coefficient is greater than the fourth correction coefficient. The reason for this is that the influence of a change in the wavelength due to a change in temperature is larger than the influence of a change in the polarization state at the time of PWM light control.

A description will be made of an example of specific processes carried out by the third correction coefficient determination portion 101. It is assumed that the third correction coefficient determination portion 101 stores, for example, a table T3, which contains values of the blue light source light emission Duty and third correction coefficients related to each other. The third correction coefficient determination portion 101 then determines the third correction coefficient, for example, by reading a third correction coefficient according to the inputted proportion of the change in the amount of blue light described above from the table T3.

The table T3 is determined, for example, by evaluating an error between a blue light optical sensor value and the luminance of the screen while actually changing the duty for the blue laser diodes 59. In this process, when the blue light optical sensor value is not corrected by using the third correction coefficient but is corrected by using the sum of the third correction coefficient and the fourth correction coefficient, the table T3 is so created that the third correction coefficient is zero.

The blue light addition section 102 adds the third correction coefficient represented by the information inputted from the third correction coefficient determination portion 101 to the fourth correction coefficient represented by the information inputted from the fourth correction coefficient determination portion 96. The blue light addition section 102 outputs a second added correction coefficient produced in the addition operation to the blue light multiplication section 94.

The blue light multiplication section 94 multiplies the blue light optical sensor present value by the second added correction coefficient represented by the information inputted from the blue light addition section 102 and uses the value produced in the multiplication operation as a corrected blue light optical sensor value. The blue light multiplication section 94 then outputs the resultant corrected blue light optical sensor value to the duty determination section 85.

Figure 9:
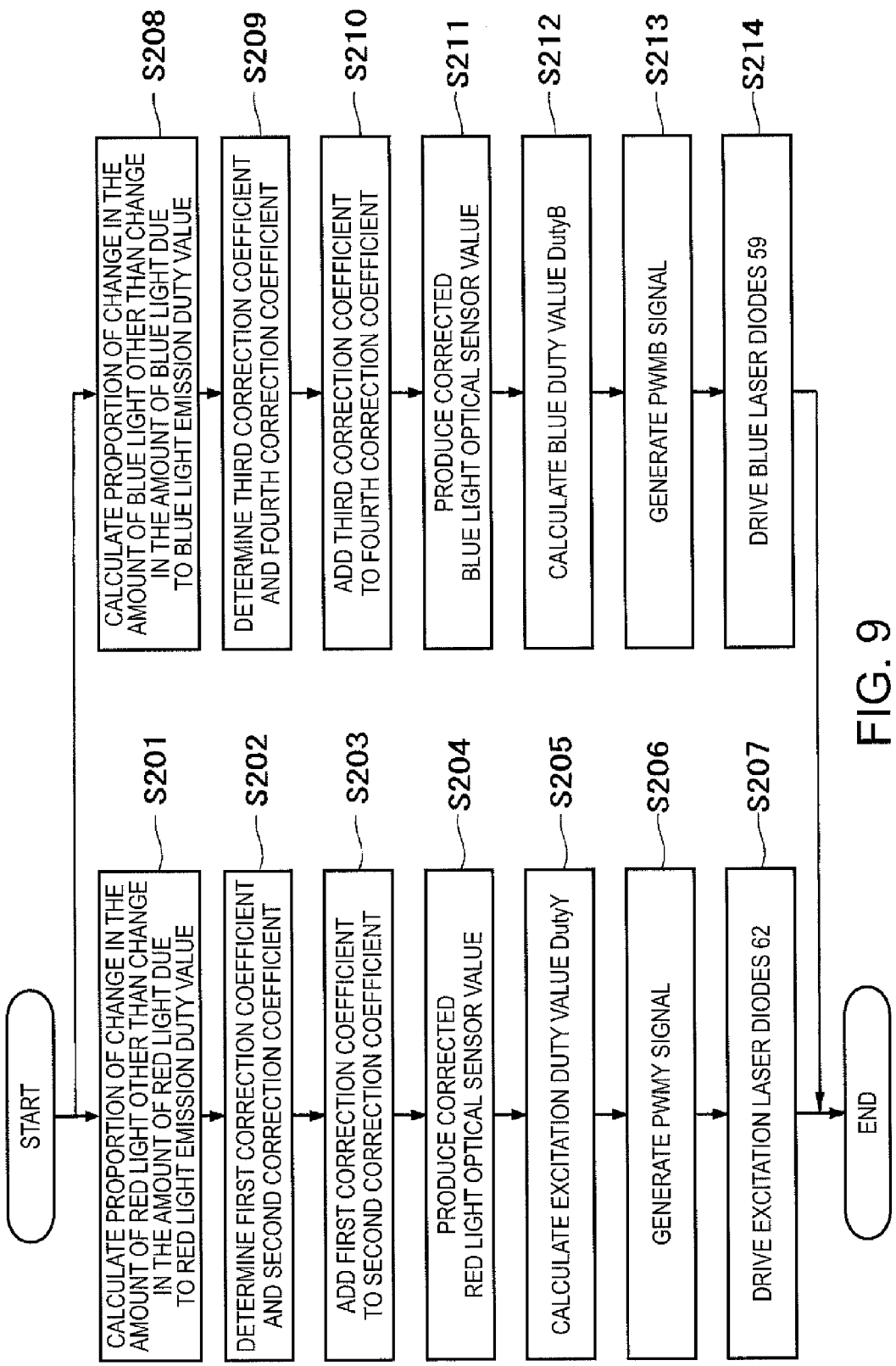
FIG. 9 is a flowchart showing an example of the procedure of processes carried out by the controller in the second embodiment.

FIG. 9 is a flowchart showing an example of the procedure of processes carried out by the controller 64b in the second embodiment. The controller 64b concurrently carries out processes in steps S201 to S207 and those in steps S208 to S214.

Step S201

The red light attenuation ratio calculation portion 82b first calculates the proportion of a change in the amount of red light other than a change in the amount of red light due to the red light emission duty value.

Step S202

The first correction coefficient determination portion 86 then determines the first correction coefficient in accordance with the yellow light source light emission Duty. Concurrently with the above process, the second correction coefficient determination portion 87 determines the second correction coefficient in accordance with the proportion of the change in the amount of red light.

Step S203

The red light addition portion S8 then calculates the added correction coefficient by adding the first correction coefficient to the second correction coefficient.

Step S204

The red light multiplication section 84 then calculates a corrected red light optical sensor value by multiplying a red light optical sensor present value by the added correction coefficient.

The processes in steps S205 to S207 are the same as those in steps S104 to S106 and will therefore not be described.

Step S208

The blue light attenuation ratio calculation portion 92b then calculates the proportion of a change in the amount of blue light other than a change in the amount of blue light due to the blue light emission duty value.

Step S209

The third correction coefficient determination portion 101 then determines the third correction coefficient in accordance with the blue light source light emission Duty. Concurrently with the above process, the fourth correction coefficient determination portion 96 determines the fourth correction coefficient in accordance with the proportion of the change in the amount of blue light.

Step S210

The blue light addition section 102 then calculates the second added correction coefficient by adding the third correction coefficient to the fourth correction coefficient.

Step S211

The blue light multiplication section 94 then calculates a corrected blue light optical sensor value by multiplying a blue light optical sensor present value by the second added correction coefficient.

The processes in steps S212 to S214 are the same as those in steps S110 to S112 and will therefore not be described. The processes in the present flowchart are thus completed.

In the second embodiment described above, the signal processor 65b can correct the red light optical sensor present value in accordance not only with the yellow light source light emission Duty but also with the proportion of the change in the amount of red light other than the change in the amount of red light due to the yellow light source light emission Duty. Similarly, the signal processor 65b can correct the blue light optical sensor present value in accordance not only with the blue light source light emission Duty but also with the proportion of the change in the amount of blue light other than the change in the amount of blue light due to the blue light source light emission Duty.

The projector 50b can thus correct optical sensor outputs more precisely than in the first embodiment. As a result, the projector 50b can display an image having brightness close to desired brightness more precisely than in the first embodiment. Further, the projector 50b can use a red light optical sensor present value or a blue light optical sensor present value to correct the amount of light from the light source even when the projector 50b is changing the light emission duties in adaptation to video images.

Third Embodiment

A third embodiment will subsequently be described. A projector 50c in the third embodiment includes a temperature sensor (temperature detector) 110. The projector 50c corrects optical sensor outputs in accordance with a change from a reference temperature sensor value. The projector 50c, which uses the temperature sensor, can correct the color balance of the light source 71 also in consideration of a change in environmental temperature, which is a change in temperature other than a change in temperature due to deterioration in the output from the light source 71.

Figure 10:
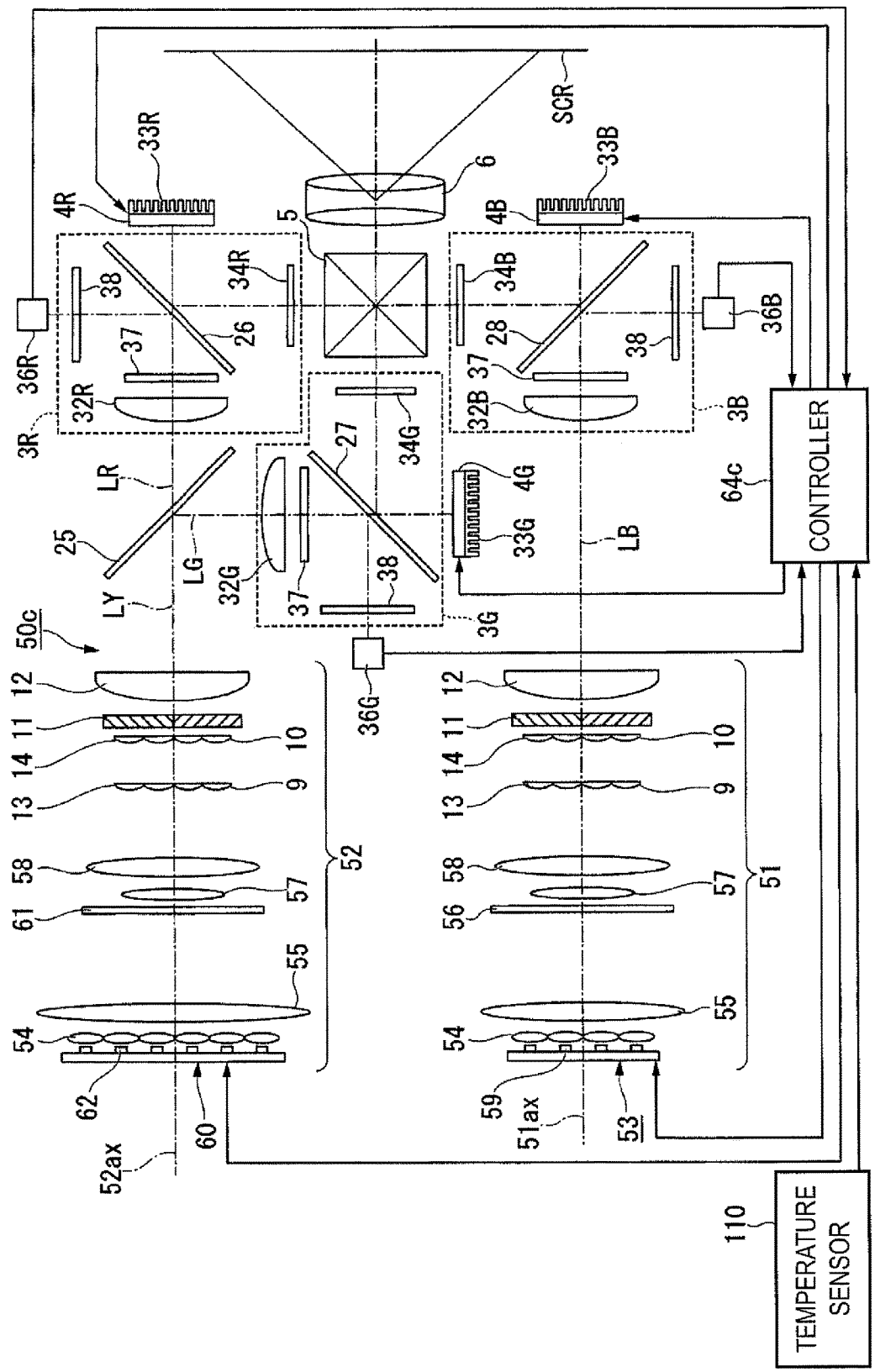
FIG. 10 is a schematic configuration diagram showing the configuration of a projector in a third embodiment.

FIG. 10 is a schematic configuration diagram showing the configuration of the projector 50c in the third embodiment. The elements common to those in FIG. 1 have the same reference characters, and no specific description thereof will be made. The configuration of the projector 50c in the third embodiment differs from the configuration of the projector 50 in the first embodiment in that the temperature sensor 110 is added and the controller 64 is replaced with a controller 64c.

It is assumed that the temperature sensor 110 is disposed in a position in the vicinity of an exhaust port through which an exhaust flow from a cooling fan (not shown) flows by way of example. The temperature sensor may instead be disposed in a position in the vicinity of an intake port. The temperature sensor 110 measures a surrounding environment temperature and outputs temperature information representing the measured environment temperature (hereinafter also referred to as temperature sensor present value) to the controller 64c.

Figure 11:
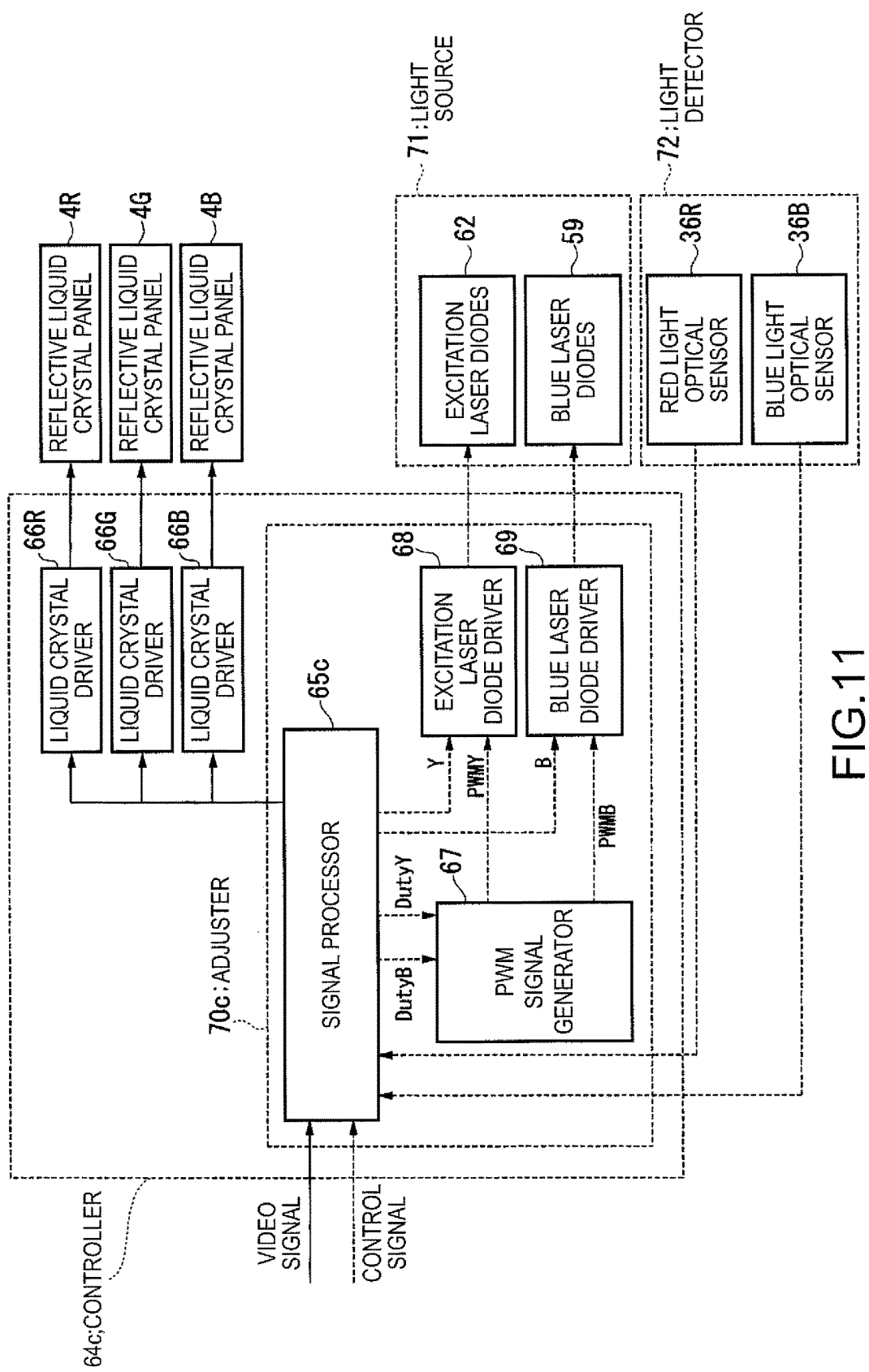
FIG. 11 is a schematic block diagram showing the configuration of a controller in the third embodiment.

FIG. 11 is a schematic block diagram showing the configuration of the controller 64c in the third embodiment. The elements common to those in FIG. 2 have the same reference characters, and no specific description thereof will be made. The configuration of the controller 64c in the third embodiment differs from the configuration of the controller 64 in the first embodiment in that the signal processor 65 in the adjuster 70 is replaced with a signal processor 65c in an adjuster 70c.

Figure 12:
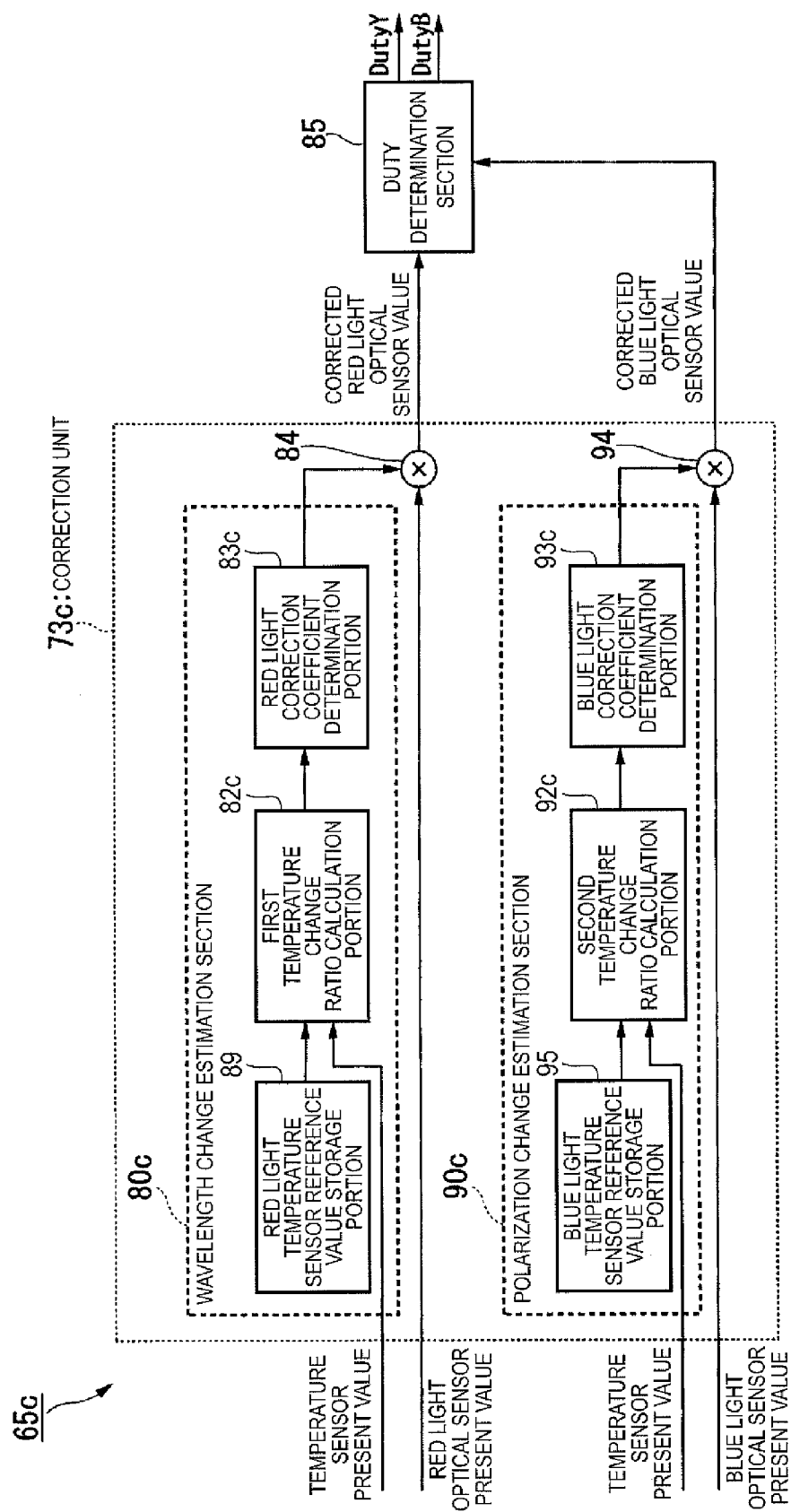
FIG. 12 is a schematic block diagram showing the configuration of a signal processor in the third embodiment.

FIG. 12 is a schematic block diagram showing the configuration of the signal processor 65c in the third embodiment. The elements common to those in FIG. 3 have the same reference characters, and no specific description thereof will be made. The signal processor 65c corrects, as the signal processor 65 in the first embodiment does, a red light optical sensor value and a blue light optical sensor value at a predetermined timing by way of example. The configuration of the signal processor 65c in the third embodiment differs from the configuration of the signal processor 65 in the first embodiment in that the wavelength change estimation section 80 is replaced with a wavelength change estimation section 80c and the polarization change estimation section 90 is replaced with a polarization change estimation section 90c.

The wavelength change estimation section 80c includes a red light temperature sensor reference value storage portion 89, a first temperature change ratio calculation portion 82c, and a red light correction coefficient determination portion 83c.

The red light temperature sensor reference value storage portion 89 stores a red light temperature sensor reference value.

The first temperature change ratio calculation portion 82c reads the red light temperature sensor reference value from the red light temperature sensor reference value storage portion 89. The first temperature change ratio calculation portion 82c acquires temperature information from the temperature sensor 110. The first temperature change ratio calculation portion 82c divides a temperature sensor present value represented by the temperature information by the red light temperature sensor reference value and sets the value produced in the dividing operation as a first temperature change ratio. The first temperature change ratio calculation portion 82c outputs information representing the calculated first temperature change ratio to the red light correction coefficient determination portion 83c.

The red light correction coefficient determination portion 83c determines a red light correction coefficient in accordance with the first temperature change ratio represented by the information inputted from the first temperature change ratio calculation portion 82c. Specifically, it is, for example, assumed that the red light correction coefficient determination portion 83c stores in advance a table that contains first temperature change ratios and red light correction coefficients related each other. The red light correction coefficient determination portion 83c then determines the red light correction coefficient, for example, by reading from the table a red light correction coefficient corresponding to the first temperature change ratio inputted from the first temperature change ratio calculation portion 82c. The red light correction coefficient determination portion 83c then outputs information representing the determined red light correction coefficient to the red light multiplication section 84.

The polarization change estimation section 90c includes a blue light temperature sensor reference value storage portion 95, a second temperature change ratio calculation portion 92c, and a blue light correction coefficient determination portion 93c.

The blue light temperature sensor reference value storage portion 95 stores a blue light temperature sensor reference value.

The second temperature change ratio calculation portion 92c reads the blue light temperature sensor reference value from the blue light temperature sensor reference value storage portion 95. The second temperature change ratio calculation portion 92c acquires temperature information from the temperature sensor 110. The second temperature change ratio calculation section 92c divides a temperature sensor present value represented by the temperature information by the blue light temperature sensor reference value and sets the value produced in the dividing operation as a second temperature change ratio. The second temperature change ratio calculation portion 92c outputs information representing the calculated second temperature change ratio to the blue light correction coefficient determination portion 93c.

The blue light correction coefficient determination portion 93c determines a blue light correction coefficient in accordance with the second temperature change ratio represented by the information inputted from the second, temperature change ratio calculation portion 92c. Specifically, it is, for example, assumed that the blue light correction coefficient determination portion 93c stores in advance a table that contains second temperature change ratios and blue light correction coefficients related to each other. The blue light correction coefficient determination portion 93c then determines the blue light correction coefficient, for example, by reading from the table a blue light correction coefficient corresponding to the second temperature change ratio inputted from the second temperature change ratio calculation portion 92c. The blue light correction coefficient determination portion 93c then outputs information representing the determined blue light correction coefficient to the blue light multiplication section 94.

Figure 13:
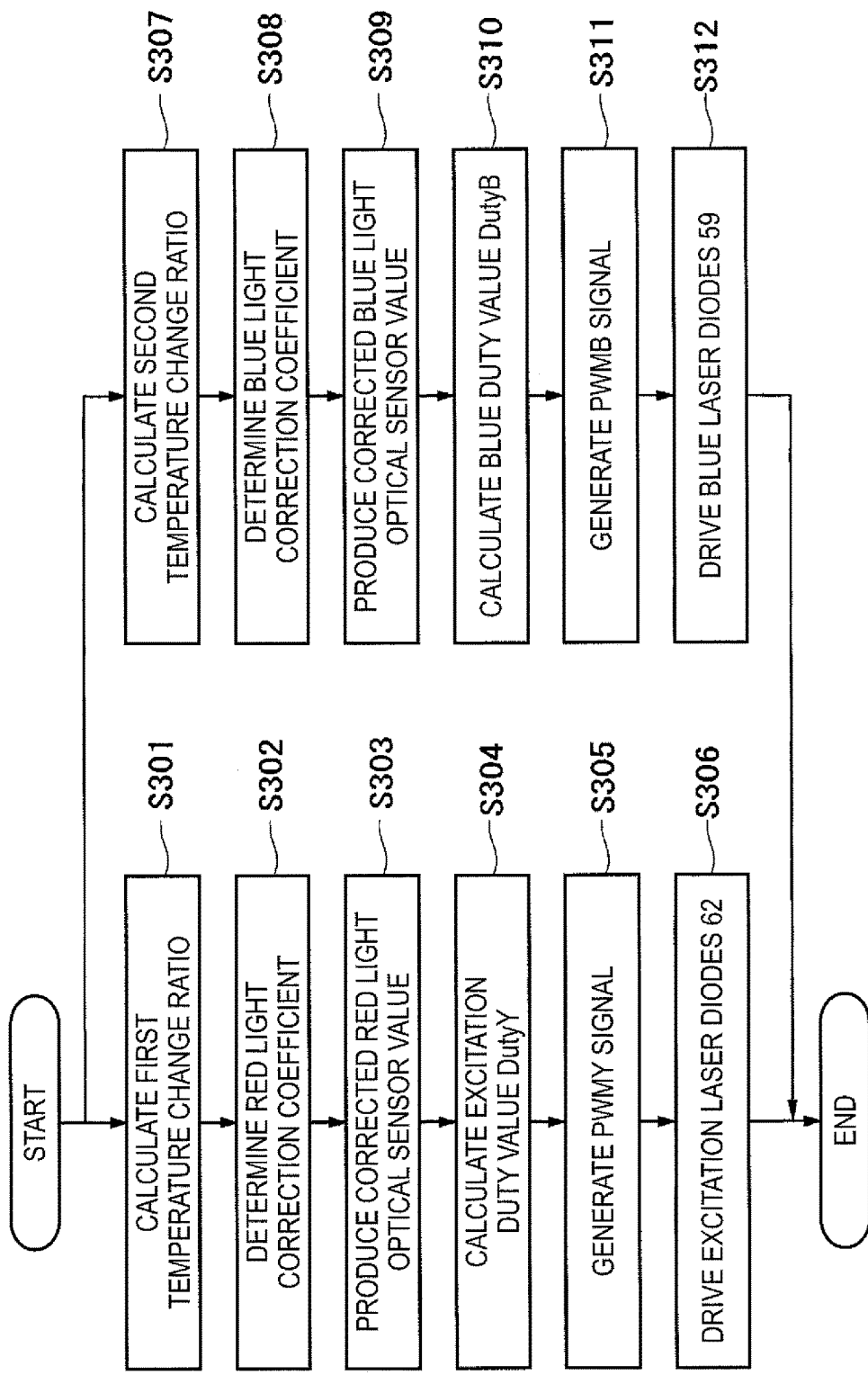
FIG. 13 is a flowchart showing an example of the procedure of processes carried out by the controller in the third embodiment.

FIG. 13 is a flowchart showing an example of the procedure of processes carried out by the controller 64c in the third embodiment. The controller 64c concurrently carries out processes in steps S301 to S306 and those in steps S307 to S312.

Step S301

The first temperature change ratio calculation portion 82c first divides a temperature sensor present value by the red light temperature sensor reference value to produce the first temperature change ratio.

Step S302

The red light correction coefficient determination portion 83c then calculates the red light correction coefficient in accordance with the first temperature change ratio.

The processes in steps S303 to S306 are the same as those in steps S103 to S106 and will therefore not be described.

Step S307

The second temperature change ratio calculation portion 92c then divides the temperature sensor present value by the blue light temperature sensor reference value to produce a second temperature change ratio.

Step S308

The blue light correction coefficient determination portion 93c then calculates the blue light correction coefficient in accordance with the second temperature change ratio.

The processes in steps S309 to S312 are the same as those in steps S109 to S112 and will therefore not be described. The processes in the present flowchart are thus completed.

In the third embodiment described above, the signal processor 65c corrects a red light optical sensor present value in accordance with a temperature sensor present value.

Similarly, the signal processor 65c corrects a blue light optical sensor present value in accordance with the temperature sensor present value. The signal processor 65c refers to the corrected red light optical sensor value and the corrected blue light optical sensor value to determine the excitation duty value DutyY and the blue duty value DutyB. The adjuster 70c then refers to the determined excitation duty value DutyY and blue duty value DutyB to adjust the output from the light source 71.

The projector 50c can thus correct optical sensor output errors due to a shift in the wavelength of light resulting from a change in environment temperature. Since the adjuster 70c adjusts the output from the light source 71 in accordance with the corrected optical sensor outputs, the projector 50c can display an image having brightness close to desired brightness, as in the first embodiment.

As described above, in the third embodiment, the projector 50c further includes the temperature detector, which detects environment temperature information representing environment temperature. The adjuster 70c refers to the environment temperature information detected with the temperature detector to estimate the light state information described above and adjusts the output from the light source 71 based on the estimated light state information. The projector 50c, which can estimate the light state information by referring to the temperature information, can therefore correct an error in light brightness information due to a shift in the wavelength of light resulting from a change in the temperature.

The projector in the first or second embodiment may include a correction unit 73c in addition to the configuration of the embodiment. In this case, in the projector 50 in the first embodiment, for example, the correction unit 73c may be connected to a correction unit 73 in a position upstream or downstream thereof and the correction unit 73c may further correct a red light optical sensor value and a blue light optical sensor value. Further, in the projector 50b in the second embodiment, for example, the correction unit 73c may be connected to a correction unit 73b in a position upstream or downstream thereof and the correction unit 73c may further correct a red light optical sensor value and a blue light optical sensor value. That is, the adjuster (70 or 70b) refers to the light brightness information detected with the light detector and the environment temperature information detected with the temperature sensor 110 to estimate the light state information. As a result, optical sensor output errors due to a shift in the wavelength resulting from the amount of light emitted from the light source 71 can be corrected, and optical sensor output errors due to a shift in the wavelength of the light emitted from the light source 71 resulting from a change in environment temperature can also be corrected. The third embodiment therefore allows correction of optical sensor outputs more precisely than the first or second embodiment. As a result, the brightness of a displayed image can be close to desired brightness more precisely than in the first or second embodiment.

Further, in the present embodiment, the temperature sensor 110 detects environment temperature, but the present embodiment is not necessarily configured this way. The projector 50c may include a first temperature sensor and a second temperature sensor. The first temperature sensor, which is associated with the excitation laser diodes 62 (hereinafter also referred to as Y light source), may detect the temperature around the fluorophore substrate 61. The reason for this is that the amount of shift in the wavelength of light changes with the temperature of the fluorophore substrate 61. The second temperature sensor, which is associated with the blue laser diodes 59 (hereinafter also referred to as B light source), may detect the temperature around the polarization conversion element 11. The reason for this is that the polarization state of light changes with the temperature of the polarization conversion element 11. In this case, the first temperature sensor outputs a present value of the temperature around the fluorophore substrate 61 to the first temperature change ratio calculation portion 82c. The red light temperature sensor reference value storage portion 89, for example, further stores in advance a reference value of the temperature around the fluorophore substrate 61. The first temperature change ratio calculation portion 82c may divide the present value of the temperature around the fluorophore substrate 61 by the reference value of the temperature around the fluorophore substrate 61 to calculate the red light correction coefficient. Further, the second temperature sensor outputs a present value of the temperature around the polarization conversion element 11 to the second temperature change ratio calculation portion 92c. The blue light temperature sensor reference value storage portion 95, for example, further stores in advance a reference value of the temperature around the polarization conversion element 11. The second temperature change ratio calculation portion 92c may divide the present value of the temperature around the polarization conversion element 11 by the reference value of the temperature around the polarization conversion element 11 to calculate the blue light correction coefficient.

Further, the first temperature sensor, which is associated with the Y light source, does not necessarily detect the temperature around the fluorophore substrate 61 but may detect the temperature around the excitation laser diodes 62, the polarization conversion element 11, the polarizing beam splitter 26, the polarizing beam splitter 27, or any other suitable optical element.

Similarly, the second temperature sensor, which is associated with the B light source, does not necessarily detect the temperature around the polarization conversion element 11 but may detect the temperature around the blue laser diodes 59, the diffuser plate 56, the polarizing beam splitter 28, or any other suitable optical element.

Fourth Embodiment

A fourth embodiment will subsequently be described.

Figure 14:
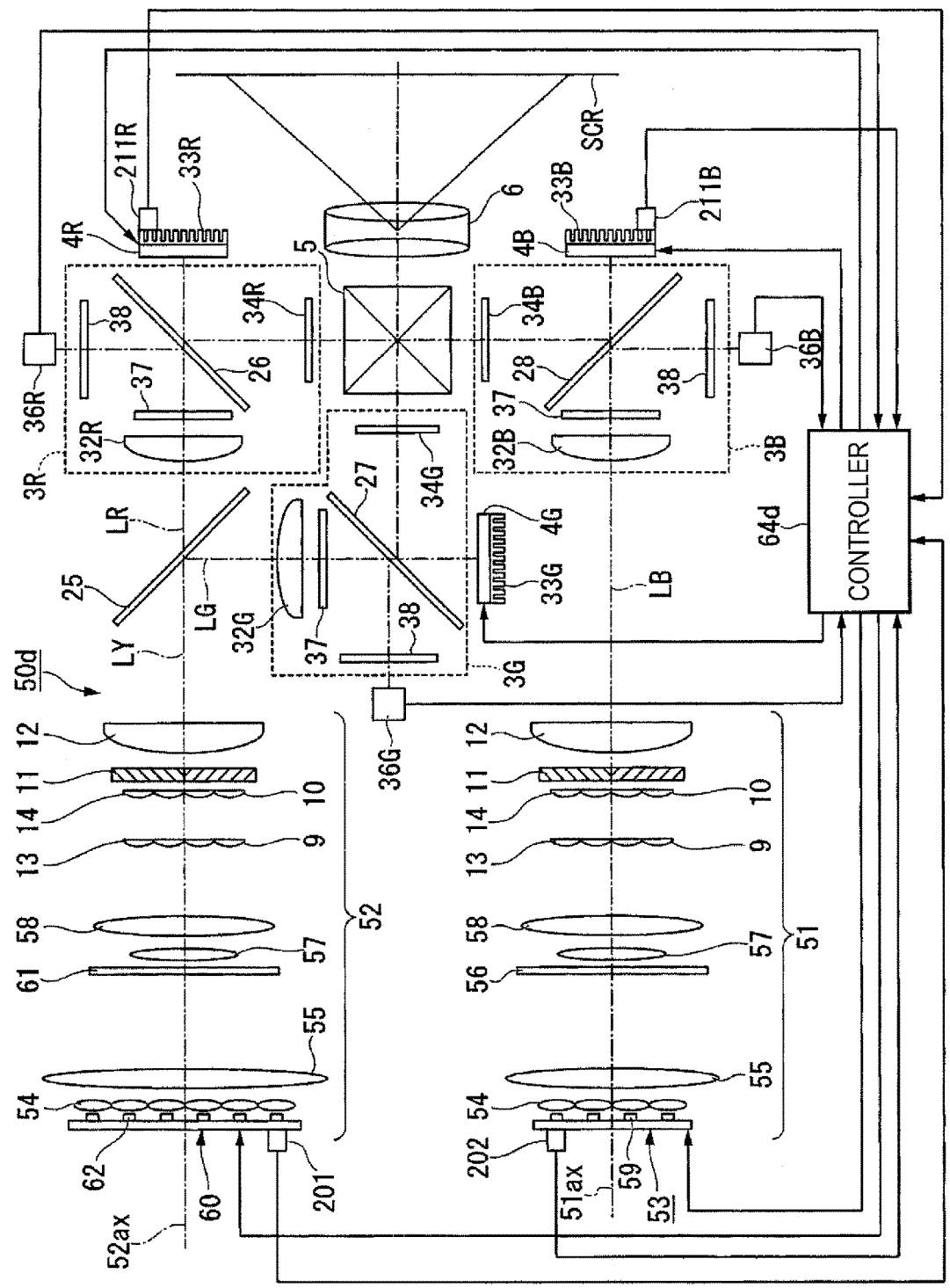
FIG. 14 is a schematic configuration diagram showing the configuration of a projector in a fourth embodiment.

FIG. 14 is a schematic configuration diagram showing the configuration of a projector 50d in the fourth embodiment. Elements common to those in FIG. 1 have the same reference characters, and specific descriptions thereof will be omitted. The configuration of the projector 50d in the fourth embodiment differs from the configuration of the projector 50 in the first embodiment in that four temperature sensors (excitation LD temperature sensor 201, blue LD temperature sensor 202, red light panel temperature sensor 211R, and blue light panel temperature sensor 211B) are added and the controller 64 is replaced with a controller 64d.

The projector 50d according to the present embodiment, specifically, a summary of elements related to the present embodiment, although they are common to those in FIG. 1, will first be described.

In the projector 50d according to the present embodiment, the light emitted from the excitation laser diode array 60 excites the fluorophore substrate 61, which converts the excitation light into Y light. The Y light is parallelized by the pickup lens 57 and the parallelizing lens 58, is homogenized by the multiple lenses, and then illuminates the reflective liquid crystal panel 4R for R light and the reflective liquid crystal panel 4G for G light.

Further, the light emitted from the blue laser diode array 53 is homogenized by the diffuser plate 56 and then illuminates the reflective liquid crystal panel 4B for B light, as in the R and G optical paths.

The light that is the combination of the R light, the G light, and the B light passes through the projection system 6 (projection lens, for example) and is projected on the screen SCR.

The optical sensors for the Y light source (red light optical sensor 36R and green light optical sensor 36G) are disposed in positions in the vicinity of the reflective liquid crystal panels for Y light (reflective liquid crystal panel 4R for R light and reflective liquid crystal panel 4G for G light). The optical sensor for the B light source (blue light optical sensor 36B) is disposed in a position in the vicinity of the reflective liquid crystal panel for B light. The optical sensors 36R, 36G, and 36B detect light fluxes separated by the polarizing beam splitters 26, 27, and 28 disposed in the respective positions upstream of the reflective liquid crystal panels 4R, 4G, and 4B. The light fluxes have a polarization direction rectified by the polarization conversion elements 11 disposed in positions further upstream of the reflective liquid crystal panels, but unrectified components that are part of the entire light fluxes are detected with the optical sensors 36R, 36G, and 36B.

The optical sensors 36R, 36G, and 36B may be arranged in any positions where they can detect the amount of light from the Y light source and the amount of light from the B light source, and the arrangement in the present embodiment is not necessarily employed.

In the projector 50d according to the present embodiment, a description will next be made of the temperature sensors (excitation LD temperature sensor 201, blue LD temperature sensor 202, red light panel temperature sensor 211R, and blue light panel temperature sensor 211B), which are elements that are not provided in FIG. 1.

In the present embodiment, the temperature sensors for tracking the state of the temperature of the projector 50d for temperature correction (excitation LD temperature sensor 201, blue LD temperature sensor 202, red light panel temperature sensor 211R, and blue light panel temperature sensor 211B) are attached to a portion around the excitation laser diodes 62 (excitation laser diode array 60), a portion around the blue laser diodes 59 (blue laser diode array 53), a portion around the reflective liquid crystal panel 4R for R light, and a portion around the reflective liquid crystal panel 4B for B light, respectively.

More specifically, in the present embodiment, the excitation LD temperature sensor 201 is attached to the excitation laser diode array 60. The blue LD temperature sensor 202 is attached to the blue laser diode array 53. The red light panel temperature sensor 211R is attached to the heat dissipation fin 33R. The blue light panel temperature sensor 211B is attached to the heat dissipation fin 33B.

Each of the red light panel temperature sensor 211R and the blue light panel temperature sensor 211B may instead be disposed in a position in the vicinity of an exhaust port through which an exhaust flow from a cooling fan flows by way of example or may be disposed in a position in the vicinity of an intake port through which the exhaust flow from the cooling fan flows as another example.

Each of the temperature sensors (excitation LD temperature sensor 201, blue LD temperature sensor 202, red light panel temperature sensor 211R, and blue light panel temperature sensor 211B) is formed, for example, of a thermistor.

In the present embodiment, the temperature sensors attached to positions in the vicinity of the reflective liquid crystal panels 4R and 4B (red light panel temperature sensor 211R and blue light panel temperature sensor 211B) allow correction in consideration of the temperature characteristics of the polarizing beam splitters 26 and 28 and other components. Further, the temperature sensors attached to positions in the vicinity of the LDs (excitation LD temperature sensor 201 and blue LD temperature sensor 202) allow correction in consideration of the temperature characteristics of the light sources (excitation laser diodes 62 and blue laser diodes 59).

In the present embodiment, as the temperature sensor for Y light, the temperature sensor for R light (red light panel temperature sensor 211R in the present embodiment) is disposed in a position around the reflective liquid crystal panel 4R for R light. In another exemplary configuration, however, the temperature sensor for R light may be replaced with a temperature sensor for G light (green light panel temperature sensor 211G, which is not shown, for example) disposed in a position around the reflective liquid crystal panel 4G for G light. Both the temperature sensor for R light and the temperature sensor for G light may even be provided.

In the configuration including both the temperature sensor for R light and the temperature sensor for G light, for example, a detection result from the temperature sensor for R light in the present embodiment can be replaced, for example, with the average of detection results from the two temperature sensors.

Further, the reflective liquid crystal panels and the heat dissipation fins are originally provided with temperature sensors for temperature monitoring purposes in a typical projector in many cases, and these temperature sensors can be used in the present embodiment.

The configuration of the projector 50d may be configured in a variety of ways.

For example, the fluorophore substrate 61 may be of reflection type. The light sources may be RGB three LDs or LEDs. Each of the light modulators (light modulation devices) may be a transmissive liquid crystal panel or a DMD. Further, whether or not the diffuser plate 56 is present may be arbitrarily determined. As described above, the detailed optical configuration is not limited to the configuration in the present embodiment.

Figure 15:
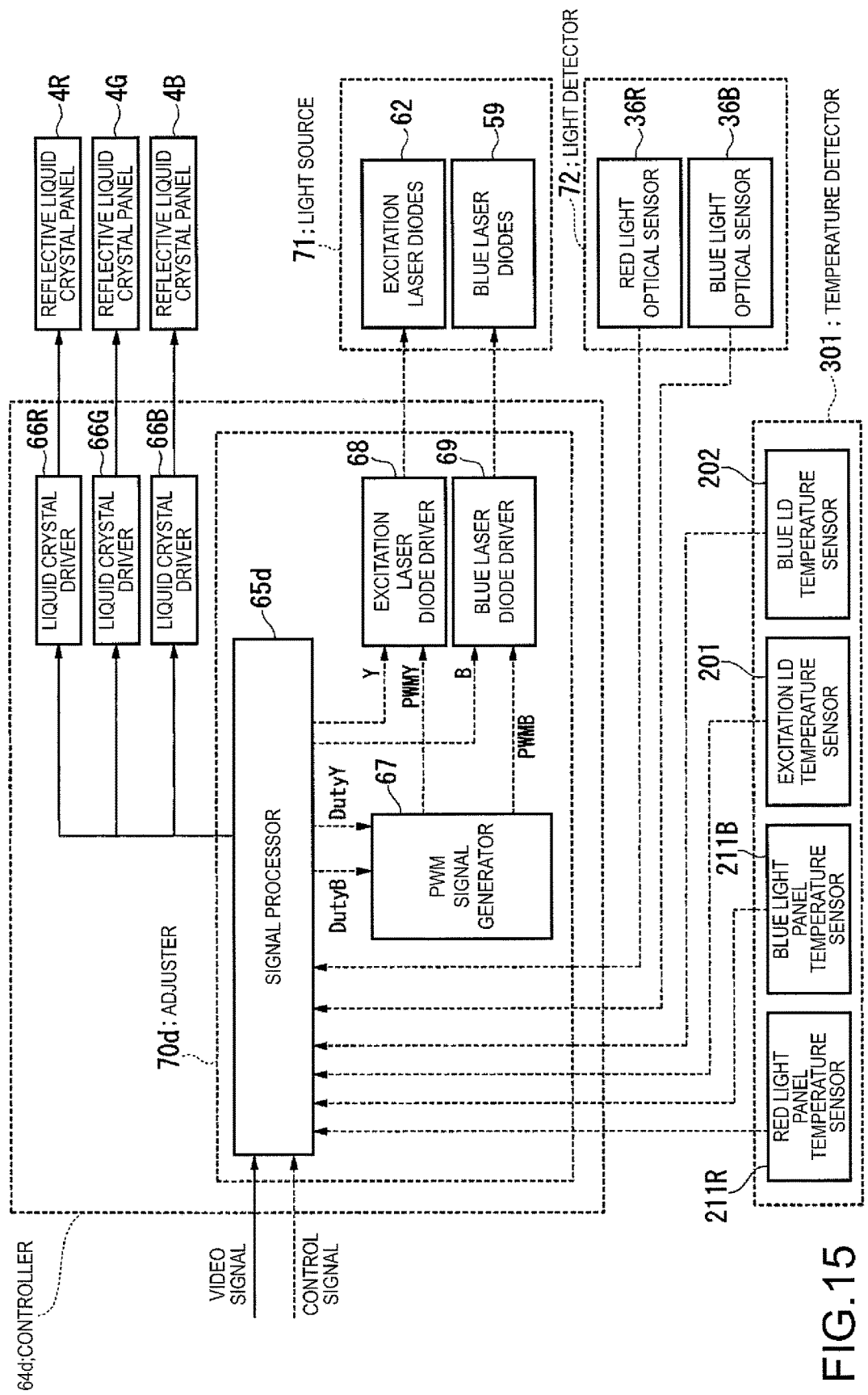
FIG. 15 is a schematic block diagram showing the configuration of a controller in the fourth embodiment.

FIG. 15 is a schematic block diagram showing the configuration of the controller 64d in the fourth embodiment. The elements common to those in FIG. 2 have the same reference characters, and specific descriptions thereof will be omitted. The configuration of the controller 64d in the fourth embodiment differs from the configuration of the controller 64 in the first embodiment in that the signal processor 65 in the adjuster 70 is replaced with a signal processor 65d in an adjuster 70d.

FIG. 15 further shows that the temperature sensors (excitation LD temperature sensor 201, blue LD temperature sensor 202, red light panel temperature sensor 211R, and blue light panel temperature sensor 211B) are connected to the signal processor 65d.

FIG. 15 further shows a temperature detector 301 including the temperature sensors (excitation LD temperature sensor 201, blue LD temperature sensor 202, red light panel temperature sensor 211R, and blue light panel temperature sensor 211B).

A description will be made of a summary of processes carried out by the controller 64*d* according to the present embodiment.

In the present embodiment, the processes are the same as those in the first embodiment except those related to the temperature sensors (excitation LD temperature sensor 201, blue LD temperature sensor 202, red light panel temperature sensor 211R, and blue light panel temperature sensor 211B).

The signal processor 65*d* applies a variety of types of image quality correction to the video signal, and the resultant video images are displayed by the reflective liquid crystal panels 4R, 4G, and 4B, which are driven by the respective liquid crystal drivers 66R, 66G, and 66B for RGB colors, on the screen SCR.

The signal processor 65*d* also performs light control on the light sources. The amount of light from each of the light sources is controlled based on the brightness and color setting changed in accordance with the user setting or the color mode on the menu screen. Further, the amount of light from each of the light sources may be controlled in adaptation to the brightness (grayscale) of the video signal in some cases.

The signal processor 65*d* stores a table showing the relationship between the brightness of each of the light sources and the duty for the light source (light emission duty value). The signal processor 65*d* refers to the table to determine duty values (excitation duty value DutyY and blue duty value DutyB) for providing preset brightness and outputs the duty values to the PWM signal generator 67.

The PWM signal generator 67 uses the duty values inputted from the signal processor 65*d* to generate the PWM signals (PWMY signal and PWMB signal) corresponding to light-on and light-off of the light sources and sends the PWM signals to the LD drivers (excitation laser diode driver 68 and blue laser diode driver 69).

The LD drivers (excitation laser diode driver 68 and blue laser diode driver 69) drive the LDs (excitation laser diodes 62 and blue laser diodes 59) in accordance with current values (PWMY signal and PWMB signal) specified by the signal processor 65*d* (constant current drive in the present embodiment) for light emission control.

The LD drivers further perform on/off control of the LDs (excitation laser diodes 62 and blue laser diodes 59) based on the waveforms of the PWM signals (PWMY signal and PWMB signal).

The light emission control of the light sources described above is performed by using control values having undergone correction based on the optical sensor outputs (optical sensor values) sent from the optical sensors (red light optical sensor 36R and blue light optical sensor 36B) to the signal processor 65*d*.

Further, in the present embodiment, the outputs from the temperature sensors (excitation LD temperature sensor 201, blue LD temperature sensor 202, red light panel temperature sensor 211R, and blue light panel temperature sensor 211B) (temperature sensor values) are sent to the signal processor 65*d* and used for correction on the optical sensors.

Figure 16:
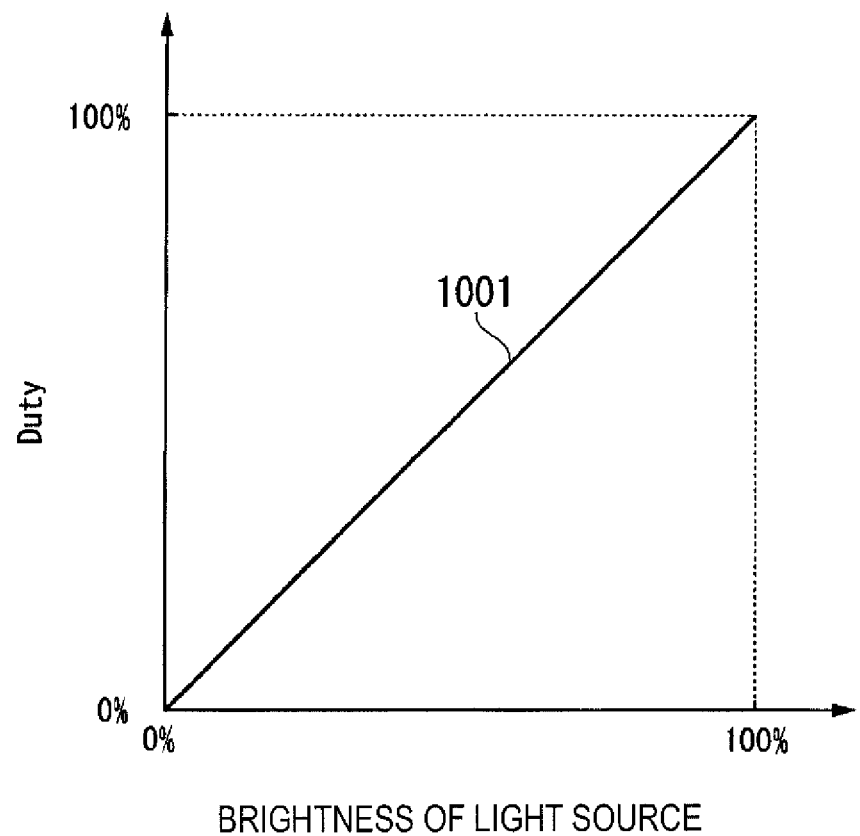
FIG. 16 shows an example of a graph illustrating the relationship between the brightness of a light source and the duty (Duty) for the light source in the fourth embodiment.

FIG. 16 shows an example of a graph illustrating the relationship between the brightness of a light source and the duty (Duty) for the light source in the fourth embodiment.

In the present embodiment, the signal processor 65*d* stores and refers to the information represented by the graph. The information is stored in advance, for example, in the form of a lookup table (LUT).

In FIG. 16, the horizontal axis represents the brightness of the light source (ranging from 0% to 100% of predetermined reference value), and the vertical axis represents the duty (ranging from 0% to 100% of predetermined reference value).

In the example shown in FIG. 16, the relationship is expressed by a straight line 1001, which means that the brightness of the light source and the duty for the light source are 1:1.

Figure 17:
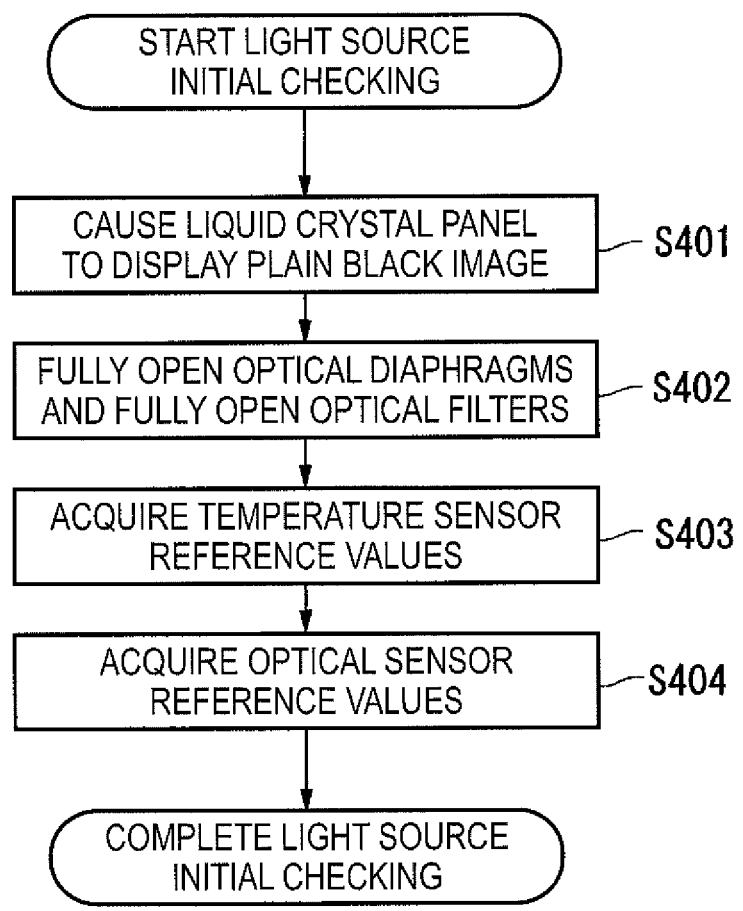
FIG. 17 is a flowchart showing an example of the procedure of processes (light source initial checking) carried out by the controller in the fourth embodiment.

FIG. 17 is a flowchart showing an example of the procedure of processes (light source initial checking) carried out by the controller 64*d* in the fourth embodiment. The light source initial checking is performed, for example, in an inspection before the projector 50*d* is shipped.

In the present embodiment, the light source initial checking is performed in a state in which no light control is performed (in light control off state).

Step S401

The signal processor 65*d* first controls each of the liquid crystal panels (reflective liquid crystal panels 4R, 4G, and 4B in the present embodiment) to display a plain black image.

Step S402

The signal processor 65*d* then sets the optical diaphragms disposed in the illumination system (first diaphragm 37 and second diaphragm 38 in the present embodiment) to be fully open and sets the optical filters disposed in the illumination system to be fully open.

Step S403

In the state set in steps S401 to S402 described above, the signal processor 65*d* then acquires a reference value of the temperature detected with each of the temperature sensors. Specifically, the signal processor 65*d* sets the temperature detected with the excitation LD temperature sensor 201 to be a reference value YLS of the temperature detected therewith, sets the temperature detected with the blue LD temperature sensor 202 to be a reference value BLS of the temperature detected therewith, sets the temperature detected with the red light panel temperature sensor 211R to be a reference value RPA of the temperature detected therewith, and sets the temperature detected with the blue light panel temperature sensor 211B to be a reference value BPA of the temperature detected therewith. The signal processor 65*d* further stores the reference values YLS, BLS, RPA, and BPA.

Step S404

In the state set in steps S401 to S402 described above, the signal processor 65*d* then acquires a reference value of light detected with each of the optical sensors. Specifically, the signal processor 65*d* sets the value of the light detected with the red light optical sensor 36R to be a reference value RSE of the light detected therewith and sets the value of the light detected with the blue light optical sensor 36B to be a reference value BSE of the light detected therewith. The signal processor 65*d* further stores the reference values RSE and BSE.

In this case, the signal processor 65*d* sets the magnitude of the current flowing through the excitation laser diodes 62 at a predetermined constant value (2.0 A, for example), sets the magnitude of the current flowing through the blue laser diodes 59 at a predetermined constant value (1.2 A, for example), and acquires the reference values of the light detected with the optical sensors.

When the reference values of the light detected with the optical sensors are measured and acquired, the excitation laser diodes 62 and the blue laser, diodes 59 may, for example, emit light intermittently or continuously.

The state set in steps S401 to S402 described above is presented by way of example, and any other setting state may be used. For example, each of the liquid crystal panels does not necessarily display a plain black image, and the optical diagrams and the optical filters are not necessarily fully open.

As described above, the controller 64d performs the light source initial checking, in which the initial states of the light sources are checked by using the optical sensors at the timings when a variety of types of image adjustment are performed in the projector 50d, and stores the checked initial states as reference states. Thereafter, the controller 64d controls the states of the light sources in such a way that the reference states are maintained. The controller 64d further sets factors that affect the amount of light received with each of the optical sensors (image displayed on liquid crystal panel, optical diaphragm, and optical filter in the present embodiment) to be those in a predetermined state in order to check the light emission states of the light sources with high precision.

Figure 18:
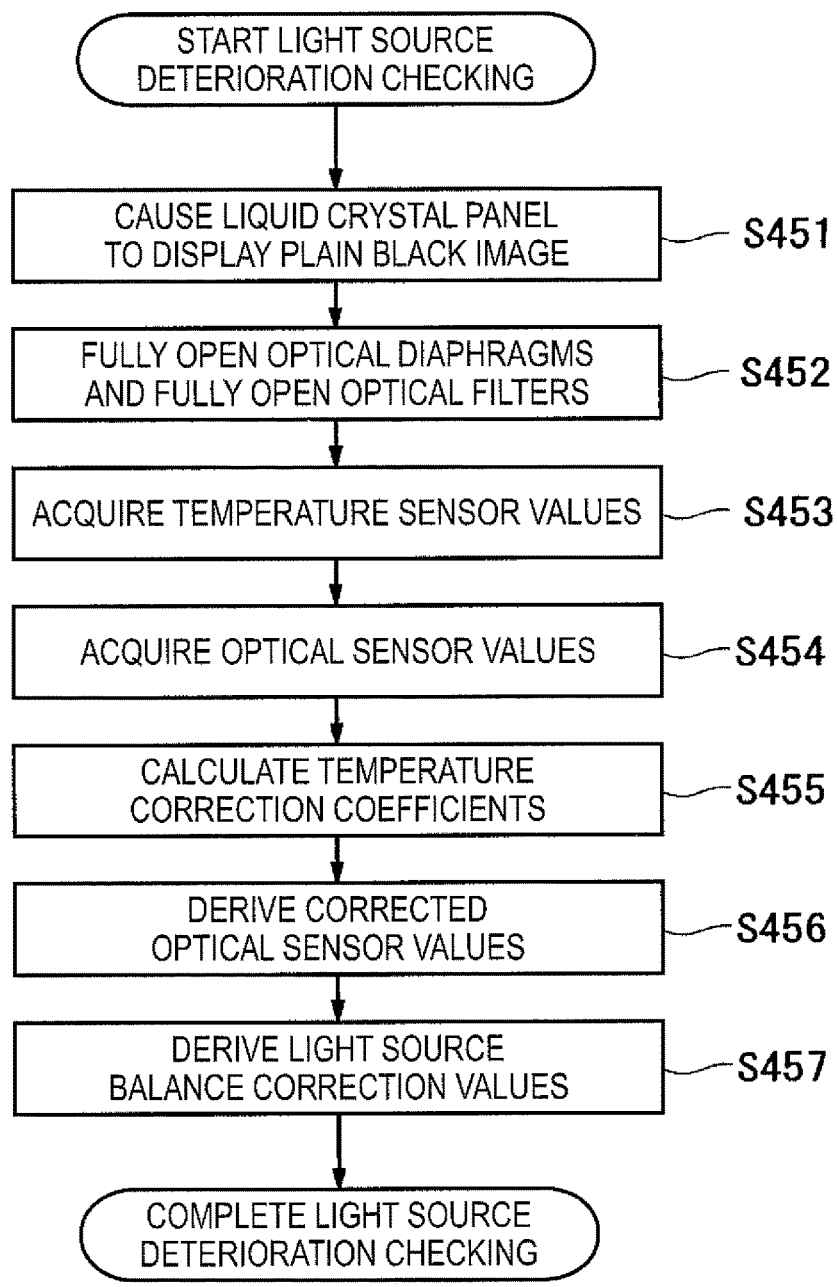
FIG. 18 is a flowchart showing an example of the procedure of processes (light source deterioration checking) carried out by the controller in the fourth embodiment.

FIG. 18 is a flowchart showing an example of the procedure of processes (light source deterioration checking) carried out by the controller in the fourth embodiment. The light source deterioration checking is performed to maintain the light source states measured in the inspection before shipment. The light source deterioration checking is, for example, performed in a completion sequence (sequence at the time of power off) after a predetermined use period (100 hours, for example) elapses since the light source initial checking or the last light source deterioration checking was performed. As another exemplary configuration, the light source deterioration checking may be performed when the user selects the light source deterioration checking on the menu screen to issue an instruction to perform the light source deterioration checking. As still another exemplary configuration, the light source deterioration checking may be performed at a timing different from the timing in the present embodiment, such as when the projector is powered on.

In the present embodiment, the light source deterioration checking is performed in a state in which no light control is performed (in light control off state).

Step S451

The signal processor 65d first controls each of the liquid crystal panels (reflective liquid crystal panels 4R, 4G, and 4B in the present embodiment) to display a plain black image.

Step S452

The signal processor 65d then sets the optical diaphragms disposed in the illumination system (first diaphragm 37 and second diaphragm 38 in the present embodiment) to be fully open and the optical filters disposed in the illumination system to be fully open.

Step S453

In the state set in steps S451 to S452 described above, the signal processor 65d then acquires a detected value from each of the temperature sensors. Specifically, the signal processor 65d acquires a temperature detected value YLS from the excitation LD temperature sensor 201, acquires a temperature detected value BLS from the blue LD temperature sensor 202, acquires a temperature detected value RPA from the red light panel temperature sensor 211R, and acquires a detected temperature value BPA from the blue light panel temperature sensor 211B. The signal processor 65d further stores the detected values YLS, BLS, RPA, and BPA.

Step S454

In the state set in steps S451 to S452 described above, the signal processor 65d then acquires a detected value from each of the optical sensors. Specifically, the signal processor 65d acquires a light detected value RSE from the red light optical sensor 36R and acquires a light detected value BSE from the blue light optical sensor 36B. The signal processor 65d further stores the detected values RSE and BSE.

It is assumed that the states set in steps S451 to S452 described above are the same as the states set in steps S401 to S402 in the light source initial checking shown in FIG. 17. As described above, in each of the light source initial checking and the light source deterioration checking, factors that affect the amount of light received with each of the optical sensors (image displayed on liquid crystal panel, optical diaphragm, and optical filter in the present embodiment) other than light source deterioration are so set to be those in a predetermined state that the factors can be eliminated.

Further, in the process in step S454 described above, the signal processor 65d sets the current value in the excitation laser diodes 62 and the current value in the blue laser diodes 59 to be the predetermined constant values set in the light source initial checking. The signal processor 65d further sets the type of light emission from the excitation laser diodes 62 and the blue laser diodes 59 (intermittent or continuous light emission, for example) to be the same as the type set in the light source initial checking.

Step S455

The signal processor 65d then uses Expressions (1) and (2) to derive and determine a temperature correction coefficient (Y light) and a temperature correction coefficient (B light).

$$\text{Temperature correction coefficient } (Y \text{ light}) = 1 + \{Y\alpha \times (\text{detected value } YLS - \text{reference value } YLS) + Y\beta \times (\text{detected value } RPA - \text{reference value } RPA)\} \quad (1)$$

$$\text{Temperature correction coefficient } (B \text{ light}) = 1 + \{B\alpha \times (\text{detected value } BLS - \text{reference value } BLS) + B\beta \times (\text{detected value } BPA - \text{reference value } BPA)\} \quad (2)$$

In Expression (1), the detected value YLS and the reference value YLS are the temperature detected value YLS from the excitation LD temperature sensor 201 in the light source deterioration checking and the reference value YLS therefrom in the light source initial checking respectively, and the detected value RPA and the reference value RPA are the temperature detected value RPA from the red light panel temperature sensor 211R in the light source deterioration checking and the reference value RPA therefrom in the light source initial checking respectively.

In Expression (2), the detected value BLS and the reference value BLS are the temperature detected value BLS from the blue LD temperature sensor 202 in the light source deterioration checking and the reference value BLS therefrom in the light source initial checking respectively, and the detected value BPA and the reference value BPA are the temperature detected value BPA from the blue light panel temperature sensor 211B in the light source deterioration checking and the reference value BPA therefrom in the light source initial checking respectively.

Further, $Y\alpha$ and $Y\beta$ in Expression (1) and $B\alpha$ and $B\beta$ in Expression (2) are predetermined coefficients, for example, constants determined in evaluations in advance assuming that the temperature characteristics of the sensors do not change.

Step S456

The signal processor 65d then uses Expressions (3) and (4) to derive and determine a corrected optical sensor value (Y light) and a corrected optical sensor value (B light).

Corrected optical sensor value (Y light)=temperature
  correction coefficient (Y light)×detected value
  RSE                                                    (3)

Corrected optical sensor value (B light)=temperature
  correction coefficient (B light)×detected value
  BSE                                                    (4)

In Expression (3), the detected value RSE is the light detected value RSE from the red light optical sensor 36R in the light source deterioration checking.

In Expression (4), the detected value BSE is the light detected value BSE from the blue light optical sensor 36B in the light source deterioration checking.

As described above, a corrected optical sensor value that depends on temperature is determined by multiplying an acquired optical sensor value by the corresponding temperature correction coefficient. Computing an optical sensor value in consideration of the corresponding temperature correction coefficient can avoid a situation in which when the amount of received light, which depends on light source temperature and optical element temperature, changes at the time of optical sensor value acquisition, the user erroneously judges that light source deterioration has occurred.

Step S457

The signal processor 65d then uses Expressions (5) and (6) to derive and determine a light source balance correction value (Y light) and a light source balance correction value (B light). When only one of the light source balance correction value (Y light) and the light source balance correction value (B light) is used, the only one of the values may be derived and determined.

Light source balance correction value (Y light)=
  LSB_Y×(reference value RSE/reference value
  BSE)/(detected value RSE/detected value BSE)           (5)

Light source balance correction value (B light)=
  LSB_B×(detected value RSE/detected value
  BSE)/(reference value RSE/reference value BSE)         (6)

In Expression (5), the detected value RSE and the reference value RSE are the light detected value RSE from the red light optical sensor 36R in the light source deterioration checking and the reference value RSE therefrom in the light source initial checking, respectively. In the present embodiment, the corrected optical sensor value (Y light) having undergone the correction in terms of temperature in Expression (3) is used as the detected value RSE.

In Expression (6), the detected value BSE and the reference value BSE are the light detected value BSE from the blue light optical sensor 36B in the light source deterioration checking and the reference value BSE therefrom in the light source initial checking, respectively. In the present embodiment, the corrected optical sensor value (B light) having undergone the correction in terms of temperature in Expression (4) is used as the detected value BSE.

Further, LSB_Y in Expression (5) is present brightness of the light from the excitation laser diodes 62. The brightness is expressed, for example, in the form of the proportion with respect to a maximum output (expressed in %).

LSB_B in Expression (6) is present brightness of the light from the blue laser diodes 59. The brightness is expressed, for example, in the form of the proportion with respect to a maximum output (expressed in %).

As described above, the ratio between the Y-light sensor value (R-light sensor value is used in the present embodiment) and the B-light sensor value is maintained constant.

As an example, when (reference value RSE/reference value BSE)<(detected value RSE/detected value BSE), the Y light is considered to be more intense than the reference thereof or the B light is considered to be less intense than the reference thereof. In this case, the signal processor 65d, for example, maintains the B light at the present intensity but lower the intensity of the Y light in accordance with Expression (5).

As another example, when (reference value RSE/reference value BSE)>(detected value RSE/detected value BSE), the Y light is considered to be less intense than the reference thereof or the B light is considered to be more intense than the reference thereof. In this case, the signal processor 65d, for example, maintains the Y light at the present intensity but lower the intensity of the B light in accordance with Expression (6).

It is noted that when one of the two types of light is more intense or the other is less intense, the user may arbitrarily control the one of the two types of light to be less intense or the other to be more intense. In the present embodiment, however, the light from one of the light sources is controlled to be less intense because controlling the light from one of the light sources to be more intense for compensation of deterioration of the light source may increase the thermal burden of the light source and hence compromise the reliability thereof in some cases.

In the present embodiment, the light source deterioration checking is completed when the light source balance values are determined.

Having performed the light source deterioration checking in the completion sequence, the signal processor 65d stores a result of the light source deterioration checking and uses the new amount of control (light source balance correction values) when the projector 50d is powered on next time.

Carrying out the processes described above to track the states of deterioration of the light sources with high precision and make correction can minimize the variation in white balance resulting from the deterioration.

It is noted that the process of acquiring the temperature sensor reference values (step S403) and the process of acquiring the optical sensor reference values (step S404) in the light source initial checking shown in FIG. 17 may be carried out in the reversed order. Similarly, the process of acquiring the temperature sensor values (step S453) and the process of acquiring the optical sensor values (step S454) in the light source deterioration checking shown in FIG. 18 may be carried out in the reversed order. It is, however, noted that the process of acquiring the temperature sensor values and the process of acquiring the optical sensor values in the light source initial checking shown in FIG. 17 and those in the light source deterioration checking shown in FIG. 18 are preferably carried out in the same order.

Further, in the light source initial checking shown in FIG. 17 and the light source deterioration checking shown in FIG. 18, to determine the light source balance correction values for desired brightness of the light sources, for example, the light source balance correction values may be determined by using the desired brightness (the same brightness), or the light source balance correction values may be determined by using different brightness and the determined light source balance correction values may be converted in accordance with the desired brightness before use.

Moreover, for example, in the light source initial checking shown in FIG. 17 and the light source deterioration checking shown in FIG. 18, in a state in which no light source balance correction values are used, light source balance correction values may be determined under this condition, or in a state in which light source balance correction values are used, light source balance correction values may be further determined under this condition (other light source balance correction values).

The signal processor 65d uses the light source balance correction value (Y light) or the light source balance correction value (B light) determined in the light source deterioration checking shown in FIG. 18 to control the excitation laser diodes 62 or the blue laser diodes 59.

Specifically, the signal processor 65d determines a duty value corresponding to the light source balance correction value (Y light) by referring to information that relates the brightness of the light source to the duty for the light source, such as the information shown in FIG. 16, and uses the determined duty value to control the excitation laser diodes 62 via the excitation laser diode driver 68. Similarly, the signal processor 65d determines a duty value corresponding to the light source balance correction value (B light) by referring to information that relates the brightness of the light source to the duty for the light source, such as the information shown in FIG. 16, and uses the determined duty value to control the blue laser diodes 59 via the blue laser diode driver 69.

The control described above may be performed at a variety of timings. For example, the control can be performed when the projector 50d is powered on.

The information that relates the brightness of a light source to the duty for the light source, such as the information shown in FIG. 16, may, for example, be prepared on a light source basis (excitation laser diodes 62 and blue laser diodes 59 in the present embodiment) or may be common to a plurality of light sources.

As an example, when video adaptive light control is being performed in a high luminance setting, the brightness for the high luminance setting (100%, for example) is multiplied by brightness determined by the adaptive light control (70%, for example), and the resultant brightness is further multiplied by a light source balance correction value. The result is used as a present brightness setting value.

As a specific example, assume that the light source balance correction value (Y light) is 100% and the light source balance correction value (B light) is 80%. When the Y light deteriorates, the Y light is so controlled that the brightness thereof is 100%×70%×100%=70%, and the B light is so controlled that the brightness thereof is 100%×70%×80%=56%.

As described above, in the projector 50d according to the present embodiment capable of detecting deterioration of the light sources based on detection results from the optical sensors and adjusting the outputs from the light sources in accordance with the detected deterioration of the light sources, the detection results from the optical sensors are corrected in accordance with detection results from the temperature sensors.

Specifically, the projector 50d according to the present embodiment includes a plurality of light sources (excitation laser diodes 62 and blue laser diodes 59, for example), a plurality of light modulation devices that modulate light from the light sources to produce image light (reflective liquid crystal panels 4R and 4B, for example), a plurality of optical sensors that detect light between the light sources and the light modulation devices (red light optical sensor 36R and blue light optical sensor 36B, for example), a plurality of temperature sensors that detect temperatures around the light sources and the light modulation devices (excitation LD temperature sensor 201, blue LD temperature sensor 202, red light panel temperature sensor 211R, and blue light panel temperature sensor 211B, for example), and the signal processor 65d, which corrects detected values from the optical sensors based on detected values from the temperature sensors, checks the states of deterioration of the light sources based on the corrected optical sensor detected values, and controls the light sources (adjust outputs from light sources) based on the states of deterioration of the light sources. Therefore, to judge whether or not the balance (ratio) between the output from the Y light source and the output from the B light source has changed due, for example, to deterioration, light components having changed due, for example, to deterioration resulting from a change in temperature are eliminated, and light components having changed due, for example, to deterioration resulting from factors other than the change in temperature are detected. The detection result is used to correct brightness, and duty values are determined based on the corrected brightness. The light sources are then controlled based on the duty values.

As described above, the projector 50d according to the present embodiment, which corrects changes in the amounts of light received with the optical sensors that occur due to the temperature characteristics of the light sources, the light modulation devices, and other components and uses the corrected optical sensor detected values to detect the states of deterioration of the light sources, can, for example, track the states of deterioration of the light sources in a short period with high precision and control the light sources in such a way that their initial states are maintained. The advantage described above is particularly effective, for example, in a configuration in which light control is performed and after a screen where the temperatures detected with the temperature sensors decrease is displayed (dark screen is displayed, for example).

In related art, for example, to detect a situation of deterioration of a light source by using an optical sensor, it is necessary to separate an instantaneous change in the amount of emitted light resulting, for example, from the temperature characteristics of a light source and an interposed optical element. Further, in related art, to acquire an optical sensor value after a light source drive current is controlled, it is necessary to consider a difference in the amount of received light between a condition under which the light source is continuously controlled and a condition under which the temperature becomes stable after the light source is controlled. In related art, the situations described above undesirably prevent accurate tracking of the deterioration of the light source.

In contrast, the present embodiment solves the problem described above.

In the present embodiment, the temperature sensors may be disposed at a variety of locations.

As a specific example, the temperature sensor associated with the excitation laser diodes 62 (excitation LD temperature sensor 201 in the present embodiment) may be disposed on the fluorophore substrate 61 or therearound, on the polarization conversion element 11 or therearound, on the polarizing beam splitter 26 or therearound, or on the polarizing beam splitter 27 or therearound.

Further, the blue LD temperature sensor 202 may be disposed on the fluorophore substrate 61 or therearound, on the polarization conversion element 11 or therearound, or on the polarizing beam splitter 28 or therearound.

Moreover, in the present embodiment, the temperatures of the light sources and the light modulation devices are detected with the respective temperature sensors for correction in terms of temperature. As another exemplary configuration, temperatures of only the light sources may be detected with the respective temperature sensors for correction in terms of temperature, and temperatures of only the light modulation devices may be detected with the respective temperature sensors for correction in terms of temperature.

Exemplary configurations according to the present embodiment are shown below.

As an exemplary configuration, the projector 50$d$ according to the present embodiment includes a light detector (light detector 72 in the present embodiment) that detects light brightness information (light detected value in the present embodiment) on the brightness of light emitted from a light source (light source 71 in the present embodiment), a temperature detector (temperature detector 301 in the present embodiment) that detects temperature information representing temperature, and an adjuster (adjuster 70$d$ in the present embodiment, which uses Expressions (1) to (6)) that corrects the light brightness information detected with the light detector described above based on the temperature information detected with the temperature detector described above and adjusts the output from the light source based on the corrected light brightness information described above.

As an exemplary configuration, the projector 50$d$ according to the present embodiment is configured as follows: The light source described above includes a first light source (excitation laser diodes 62 in the present embodiment) and a second light source (blue laser diodes 59 in the present embodiment); the light detector described above includes a first light detector (red light optical sensor 36R in the present embodiment or green light optical sensor 36G as another exemplary configuration) corresponding to the first light source and a second light detector (blue light optical sensor 36B in the present embodiment) corresponding to the second light source described above; the temperature detector described above includes a first temperature detector (excitation LD temperature sensor 201 and red light panel temperature sensor 211R in the present embodiment or green light panel temperature sensor as another exemplary configuration) corresponding to the first light source described above and a second temperature detector (blue LD temperature sensor 202 and blue light panel temperature sensor 211B in the present embodiment) corresponding to the second light source described above; and the adjuster described above corrects first light brightness information detected with the first light detector described above based on first temperature information detected with the first temperature detector described above, corrects second light brightness information detected with the second light detector described above based on second temperature information detected with the second temperature detector described above, and adjusts one or both of the output from the first light source and the output from the second light source based on the corrected first light brightness information described above and the corrected second light brightness information described above.

As an exemplary configuration, the projector 50$d$ according to the present embodiment further includes a first light modulation device (reflective liquid crystal panel 4R for R light in the present embodiment or reflective liquid crystal panel 4G for G light as another exemplary configuration) corresponding to the first light source described above and a second light modulation device (reflective liquid crystal panel 4B for B light in the present embodiment) corresponding to the second light source described above. The first light detector described above detects first light brightness information on the brightness of the light between the first light source described above and the first light modulation device described above, and the second light detector described above detects second light brightness information on the brightness of the light between the second light source described above and the second light modulation device described above. The first temperature detector described above includes a first light source peripheral temperature detector (excitation LD temperature sensor 201 in the present embodiment) that detects first light source, peripheral temperature information representing the temperature at the periphery of the first light source described above and a first light modulation device peripheral temperature detector (red light panel temperature sensor 211R in the present embodiment or green light panel temperature sensor as another exemplary configuration) that detects first light modulation device peripheral temperature information representing the temperature at the periphery of the first light modulation device described above, and the second temperature detector described above includes a second light source peripheral temperature detector (blue LD temperature sensor 202 in the present embodiment) that detects second light source peripheral temperature information representing the temperature at the periphery of the second light source described above and a second light modulation device peripheral temperature detector (blue light panel temperature sensor 211B in the present embodiment) that detects second light modulation device peripheral temperature information representing the temperature at the periphery of the second light modulation device described above.

As an exemplary configuration, in the projector 50$d$ according to the present embodiment, the first light source described above is a Y light source, and the second light source described above is a B light source. The first light detector described above and the first light modulation device peripheral temperature detector described above are provided in correspondence with one or both of R and G.

As an exemplary configuration, a method for controlling the projector 50$d$ according to the present embodiment includes the procedure of causing the light detector to detect the light brightness information on the brightness of the light emitted from the light source, the procedure of causing the temperature detector to detect the temperature information representing temperature, and the procedure of causing the adjuster to correct the light brightness information detected with the light detector described above based on the temperature information detected with the temperature detector described above and adjusts the output from the light source described above based on the corrected light brightness information described above.

A program for carrying out the processes associated with the controller (64, 64$b$, 64$c$, or 64$d$) in each of the embodiments may be recorded on a computer readable recording medium, and the program recorded on the recording medium may be read into a computer system and executed. The variety of processes described above associated with the controller (64, 64$b$, 64$c$, or 64$d$) may thus be carried out.

The "computer system" used herein may include an OS and a peripheral apparatus or any other type of hardware. Further, when the "computer system" uses a WWW system, it is assumed that the computer system also includes a website providing environment (or displaying environment). Further, the "computer readable recording medium" used herein refers to a flexible disk, an magneto-optical disk, a ROM, a flash memory, and other rewritable nonvolatile memories, a CD-ROM and other mobile media, and a hard disk drive built in the computer system and other storage devices.

Further, the "computer readable recording medium" also includes a medium that holds a program for a fixed period, such as a volatile memory (DRAM (dynamic random access memory), for example) in a computer system that serves as a server or a client in a case where the program is transmitted via the Internet or any other network or a telephone line or any other communication line. Further, the program described above may be transferred from a computer system in which the program is stored in a storage device or any other component to another computer system via a transfer medium or a carrier in the transfer medium. The "transfer medium" that transfers the program refers to a medium having a function of transferring information, such as the Internet or any other network (communication network) or a telephone line or any other communication line. Further, the program described above may be a program that achieves part of the function described above. Moreover, the function described above may be achieved by the program described above combined with a program having already been recorded in a computer system, what is called a difference file (difference program).

The embodiments of the invention have been described above in detail with reference to the drawings, but the specific configurations are not limited thereto. The configurations in the embodiments and combinations of the configurations are presented by way of example, and addition of a configuration and omission, replacement, and other changes of any of the configurations described above can be made to the extent that the changes do not depart from the substance of the invention. Further, the invention is not limited by the embodiments but is limited only by the appended claims.

What is claimed is:

1. A projector comprising:
   a light detector that detects a first detection value of brightness of light emitted from a light source; and
   an adjuster that corrects the first detection value to a second corrected detection value by applying a correction coefficient to the first detection value and adjusts an output from the light source based on the second corrected detection value,
   the adjuster determining the correction coefficient based on pre-stored correlation data correlating each of a plurality of correction coefficients to a corresponding one of a plurality of attenuation values indicative of attenuation of the light detector, each attenuation value being a ratio of the first detection value to a pre-stored reference light detector detection value.

2. The projector according to claim 1, further comprising a temperature detector that detects temperature information representing temperature, wherein
   the adjuster corrects light brightness information detected with the light detector based on the temperature information detected with the temperature detector and adjusts the output from the light source based on the corrected light brightness information.

3. The projector according to claim 2, wherein
   the light source includes a first light source and a second light source,
   the light detector includes a first light detector corresponding to the first light source and a second light detector corresponding to the second light source,
   the temperature detector includes a first temperature detector corresponding to the first light source and a second temperature detector corresponding to the second light source, and
   the adjuster corrects first light brightness information detected with the first light detector based on first temperature information detected with the first temperature detector, corrects second light brightness information detected with the second light detector based on second temperature information detected with the second temperature detector, and adjusts one or both of an output from the first light source and an output from the second light source based on the corrected first light brightness information and the corrected second light brightness information.

4. The projector according to claim 1, wherein
   the adjuster estimates light state information representing a state of the light emitted from the light source and adjusts the output from the light source based on the estimated light state information.

5. The projector according to claim 4, further comprising a temperature detector that detects temperature information representing temperature, wherein
   the adjuster refers to the temperature information detected with the temperature detector to estimate the light state information.

6. The projector according to claim 4, further comprising a temperature detector that detects temperature information representing temperature, wherein
   the adjuster refers to light brightness information detected with the light detector and the temperature information detected with the temperature detector to estimate the light state information.

7. The projector according to claim 4, wherein
   the adjuster refers to light brightness information detected with the light detector to estimate the light state information.

8. The projector according to claim 7, wherein
   the adjuster refers to the light brightness information detected with the light detector to estimate a change in a wavelength of the light and adjusts the output from the light source based on the estimated change in the wavelength of the light.

9. The projector according to claim 7, wherein
   the adjuster refers to the light brightness information detected with the light detector to estimate a change in a state of polarization of the light and adjusts the output from the light source based on the estimated change in the state of polarization of the light.

10. The projector according to claim 1, wherein
    the light detector detects light brightness information on brightness of light different from light to be projected on a screen.

11. The projector according to claim 10, further comprising
    a polarization separation element that separates light incident from the light source into differently polarized light fluxes, wherein
    the light detector receives the light fluxes separated by the polarization separation element and detects light brightness information on brightness of the light different from the light to be projected on the screen.

12. A method for controlling a projector, the method comprising:
    a procedure of causing a light detector to detect a first detection value of brightness of light emitted from a light source; and
    a procedure of causing an adjuster to correct the first detection value to a second corrected detection value by applying a correction coefficient to the first detection value and adjust an output from the light source based on the second corrected detection value, the adjuster determining the correction coefficient based on pre-stored correlation data correlating each of a plurality of correction coefficients to a corresponding one of a plurality of attenuation values indicative of attenuation of the light detector, each attenuation value being a ratio of the first detection value to a pre-stored reference light detector detection value.

13. A projector comprising:

a light detector that detects light brightness information on brightness of light emitted from a light source, wherein the light source includes a first light source and a second light source, and the light detector includes a first light detector corresponding to the first light source and a second light detector corresponding to the second light source;

an adjuster that corrects the light brightness information detected with the light detector and adjusts an output from the light source based on the corrected light brightness information;

a temperature detector that detects temperature information representing temperature, wherein the temperature detector includes a first temperature detector corresponding to the first light source and a second temperature detector corresponding to the second light source;

a first light modulation device corresponding to the first light source; and a second light modulation device corresponding to the second light source, wherein the adjuster corrects the light brightness information detected with the light detector based on the temperature information detected with the temperature detector and adjusts the output from the light source based on the corrected light brightness information, the adjuster corrects first light brightness information detected with the first light detector based on first temperature information detected with the first temperature detector, corrects second light brightness information detected with the second light detector based on second temperature information detected with the second temperature detector, and adjusts one or both of an output from the first light source and an output from the second light source based on the corrected first light brightness information and the corrected second light brightness information, the first light detector detects first light brightness information on brightness of light between the first light source and the first light modulation device, the second light detector detects second light brightness information on brightness of light between the second light source and the second light modulation device, the first temperature detector includes a first light source peripheral temperature detector that detects first light source peripheral temperature information representing temperature at a periphery of the first light source and a first light modulation device peripheral temperature detector that detects first light modulation device peripheral temperature information representing temperature at a periphery of the first light modulation device, and the second temperature detector includes a second light source peripheral temperature detector that detects second light source peripheral temperature information representing temperature at a periphery of the second light source and a second light modulation device peripheral temperature detector that detects second light modulation device peripheral temperature information representing temperature at a periphery of the second light modulation device.

14. The projector according to claim 13, wherein the first light source is a Y light source, the second light source is a B light source, and the first light detector and the first light modulation device peripheral temperature detector are provided in correspondence with one or both of R and G.

* * * * *